US012562939B2

(12) United States Patent
Pezeshki et al.

(10) Patent No.: US 12,562,939 B2
(45) Date of Patent: Feb. 24, 2026

(54) BEAM SELECTION USING OVERSAMPLED BEAMFORMING CODEBOOKS AND CHANNEL ESTIMATES

(71) Applicant: QUALCOMM Incorporated, San Diego, CA (US)

(72) Inventors: Hamed Pezeshki, San Diego, CA (US); Taesang Yoo, San Diego, CA (US); Tao Luo, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 17/658,025

(22) Filed: Apr. 5, 2022

(65) Prior Publication Data

US 2023/0318881 A1　Oct. 5, 2023

(51) Int. Cl.
 H04L 25/02 (2006.01)
 H04B 7/0456 (2017.01)
 H04B 7/06 (2006.01)
 H04B 7/08 (2006.01)

(52) U.S. Cl.
 CPC ....... H04L 25/0254 (2013.01); H04B 7/0456 (2013.01); H04B 7/0617 (2013.01); H04L 25/0242 (2013.01)

(58) Field of Classification Search
 CPC . H04L 25/02; H04L 25/0254; H04L 25/0242; H04B 7/0413; H04B 7/0416; H04B 7/0456; H04B 7/06; H04B 7/0613; H04B 7/0615; H04B 7/0617
 See application file for complete search history.

(56) References Cited

U.S. PATENT DOCUMENTS

| 7,151,802 B1 * | 12/2006 | Bessette | G10L 19/26 |
| | | | 704/203 |
| 7,907,913 B2 * | 3/2011 | Lee | H04L 25/0204 |
| | | | 455/69 |

(Continued)

FOREIGN PATENT DOCUMENTS

| EP | 3577776 B1 | 8/2021 |
| WO | WO-2020204887 A1 | 10/2020 |

OTHER PUBLICATIONS

International Search Report and Written Opinion—PCT/US2023/061456—ISA/EPO—Apr. 17, 2023.

*Primary Examiner* — Jenee Holland
(74) *Attorney, Agent, or Firm* — Harrity & Harrity, LLP

(57) ABSTRACT

Various aspects of the present disclosure generally relate to wireless communication. In some aspects, a first network node may receive, from a second network node, codebook information that indicates a plurality of beams associated with an oversampled transmitter network node beamforming codebook. The first network node may transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook. Numerous other aspects are described.

30 Claims, 18 Drawing Sheets

(56) References Cited

U.S. PATENT DOCUMENTS

| | | | | |
|---|---|---|---|---|
| 8,731,480 | B2* | 5/2014 | Kim | H04B 7/0621 |
| | | | | 375/267 |
| 9,025,641 | B2* | 5/2015 | Kramer | H04B 7/15557 |
| | | | | 370/335 |
| 9,641,357 | B1* | 5/2017 | Pajovic | H04L 25/0224 |
| 9,948,377 | B1* | 4/2018 | Kim | H04B 14/006 |
| 10,110,286 | B2* | 10/2018 | Onggosanusi | H04B 7/0626 |
| 10,476,575 | B2* | 11/2019 | Park | H04B 7/06 |
| 10,581,498 | B2* | 3/2020 | Jöngren | H04L 25/0391 |
| 10,666,342 | B1* | 5/2020 | Landis | G06N 3/045 |
| 10,998,943 | B2* | 5/2021 | Raghavan | H04B 7/088 |
| 2008/0080449 | A1* | 4/2008 | Huang | H04B 7/0639 |
| | | | | 370/342 |
| 2009/0143008 | A1* | 6/2009 | Hottinen | H04B 7/0619 |
| | | | | 455/11.1 |
| 2009/0238303 | A1* | 9/2009 | Mondal | H04L 25/03343 |
| | | | | 375/295 |
| 2010/0272206 | A1* | 10/2010 | Mazzarese | H04B 7/0478 |
| | | | | 375/267 |
| 2010/0315970 | A1* | 12/2010 | Ramamurthi | H04B 7/0619 |
| | | | | 370/252 |
| 2011/0034192 | A1* | 2/2011 | Lim | H04B 7/0639 |
| | | | | 455/501 |
| 2011/0150132 | A1* | 6/2011 | Kim | H04B 7/0639 |
| | | | | 375/296 |
| 2011/0188549 | A1* | 8/2011 | Wan | H04B 7/0615 |
| | | | | 375/213 |
| 2012/0015680 | A1* | 1/2012 | Yang | H04B 7/022 |
| | | | | 455/517 |
| 2012/0087265 | A1* | 4/2012 | Tamaki | H01Q 1/246 |
| | | | | 370/252 |
| 2012/0328031 | A1* | 12/2012 | Pajukoski | H04B 7/0469 |
| | | | | 375/259 |
| 2013/0028341 | A1* | 1/2013 | Ayach | H04B 7/0639 |
| | | | | 375/267 |
| 2013/0107667 | A1* | 5/2013 | Boufounos | G01S 15/89 |
| | | | | 367/99 |
| 2013/0156010 | A1* | 6/2013 | Dinan | H04W 72/20 |
| | | | | 370/335 |
| 2013/0208704 | A1* | 8/2013 | Hultell | H04W 16/28 |
| | | | | 370/335 |
| 2013/0272438 | A1* | 10/2013 | Zhu | H04B 7/0617 |
| | | | | 375/267 |
| 2013/0272439 | A1* | 10/2013 | Zhang | H04B 7/0634 |
| | | | | 375/267 |
| 2013/0286903 | A1* | 10/2013 | Khojastepour | H04B 1/123 |
| | | | | 370/280 |
| 2014/0050280 | A1* | 2/2014 | Stirling-Gallacher | |
| | | | | H04B 7/0665 |
| | | | | 375/296 |
| 2014/0334564 | A1* | 11/2014 | Singh | H04B 7/0413 |
| | | | | 375/267 |
| 2014/0341312 | A1* | 11/2014 | Lee | H04B 7/0417 |
| | | | | 375/267 |
| 2015/0180555 | A1* | 6/2015 | Sirotkin | H04B 7/063 |
| | | | | 370/329 |
| 2015/0200719 | A1* | 7/2015 | Cui | H04W 72/23 |
| | | | | 375/267 |
| 2015/0215934 | A1* | 7/2015 | Davydov | H04W 52/143 |
| | | | | 370/329 |
| 2015/0341095 | A1* | 11/2015 | Yu | H04B 7/061 |
| | | | | 370/252 |
| 2016/0198474 | A1* | 7/2016 | Raghavan | H04B 7/0456 |
| | | | | 370/335 |
| 2016/0294454 | A1* | 10/2016 | Onggosanusi | H04B 7/0482 |
| 2016/0323022 | A1* | 11/2016 | Rahman | H04B 7/0478 |
| 2016/0337056 | A1* | 11/2016 | Frenne | H04W 24/10 |
| 2016/0345309 | A1* | 11/2016 | Xiong | H04L 5/0035 |
| 2017/0012684 | A1* | 1/2017 | Zhang | H04B 7/0456 |
| 2017/0244815 | A1* | 8/2017 | Pajovic | H04W 28/04 |
| 2017/0279508 | A1* | 9/2017 | Truong | H04B 7/0626 |
| 2017/0288754 | A1* | 10/2017 | Tomeba | H04B 7/0413 |
| 2017/0338875 | A1* | 11/2017 | Berglund | H04B 7/0626 |
| 2017/0347391 | A1* | 11/2017 | Tenny | H04B 7/0617 |
| 2018/0234960 | A1* | 8/2018 | Nagaraja | H04B 7/0695 |
| 2018/0248596 | A1* | 8/2018 | Xiao | H04L 25/0204 |
| 2018/0310317 | A1* | 10/2018 | Wigren | H04B 7/0626 |
| 2018/0316407 | A1* | 11/2018 | Rahman | H04B 7/0621 |
| 2019/0007112 | A1* | 1/2019 | Faxér | H04B 7/0626 |
| 2019/0044589 | A1* | 2/2019 | Park | H04B 7/0408 |
| 2019/0173551 | A1* | 6/2019 | Wang | H04B 7/0626 |
| 2019/0207656 | A1* | 7/2019 | Åhlander | H04B 7/0421 |
| 2019/0273537 | A1* | 9/2019 | Rahman | H04B 7/0456 |
| 2019/0327714 | A1* | 10/2019 | Wang | H04B 7/0695 |
| 2019/0335344 | A1* | 10/2019 | Lopez-Perez | H04L 41/0816 |
| 2019/0386726 | A1* | 12/2019 | Fresia | H04B 7/0408 |
| 2020/0136702 | A1* | 4/2020 | Rahman | H04B 7/0482 |
| 2020/0145866 | A1* | 5/2020 | Onggosanusi | H04B 7/088 |
| 2020/0177249 | A1* | 6/2020 | Ramireddy | H04B 7/0673 |
| 2020/0220603 | A1* | 7/2020 | Hao | H04B 7/0695 |
| 2020/0274597 | A1* | 8/2020 | Chen | H04W 72/04 |
| 2020/0304182 | A1* | 9/2020 | Ibrahim | H04B 7/0417 |
| 2020/0382346 | A1* | 12/2020 | Noureddine | H04B 7/02 |
| 2021/0058131 | A1* | 2/2021 | Zhu | H04B 7/088 |
| 2021/0067232 | A1* | 3/2021 | Tang | H04B 7/0456 |
| 2021/0075474 | A1* | 3/2021 | Raghavan | H04B 7/0417 |
| 2021/0076404 | A1* | 3/2021 | Tsai | H04W 72/23 |
| 2021/0099210 | A1* | 4/2021 | Ramireddy | H04B 7/0626 |
| 2021/0135716 | A1* | 5/2021 | Kuo | H04B 7/0456 |
| 2021/0159992 | A1* | 5/2021 | Sadiq | H04B 7/0695 |
| 2021/0167825 | A1* | 6/2021 | Ramireddy | H04B 7/0417 |
| 2021/0185706 | A1* | 6/2021 | Park | H04J 13/004 |
| 2021/0226674 | A1* | 7/2021 | Ramireddy | H04B 7/0639 |
| 2021/0242988 | A1* | 8/2021 | Kwak | H04L 27/26 |
| 2021/0266914 | A1* | 8/2021 | Yoo | H04L 5/0025 |
| 2021/0297118 | A1* | 9/2021 | Kwak | H04B 7/0632 |
| 2021/0314056 | A1* | 10/2021 | Tang | H04B 7/0695 |
| 2021/0409991 | A1* | 12/2021 | Park | H04L 5/0057 |
| 2022/0006496 | A1* | 1/2022 | Park | H04W 72/23 |
| 2022/0029676 | A1* | 1/2022 | Ramireddy | H04B 7/0626 |
| 2022/0039160 | A1* | 2/2022 | Wang | H04W 74/006 |
| 2022/0060297 | A1* | 2/2022 | Tomeba | H04B 7/063 |
| 2022/0085858 | A1* | 3/2022 | Li | H04B 7/0639 |
| 2022/0149908 | A1* | 5/2022 | Gao | H04B 7/0634 |
| 2023/0006718 | A1* | 1/2023 | Kostas | H04B 7/0695 |
| 2023/0022578 | A1* | 1/2023 | Park | H04B 7/0695 |
| 2023/0033336 | A1* | 2/2023 | Awoniyi-Oteri | H04W 16/28 |
| 2023/0188184 | A1* | 6/2023 | Chen | H04B 7/06 |
| | | | | 375/295 |
| 2024/0154650 | A1* | 5/2024 | Faxér | H04B 7/0456 |
| 2024/0291551 | A1* | 8/2024 | Jaldén | H04L 25/0224 |
| 2024/0340125 | A1* | 10/2024 | Marzban | H04B 7/0456 |

* cited by examiner

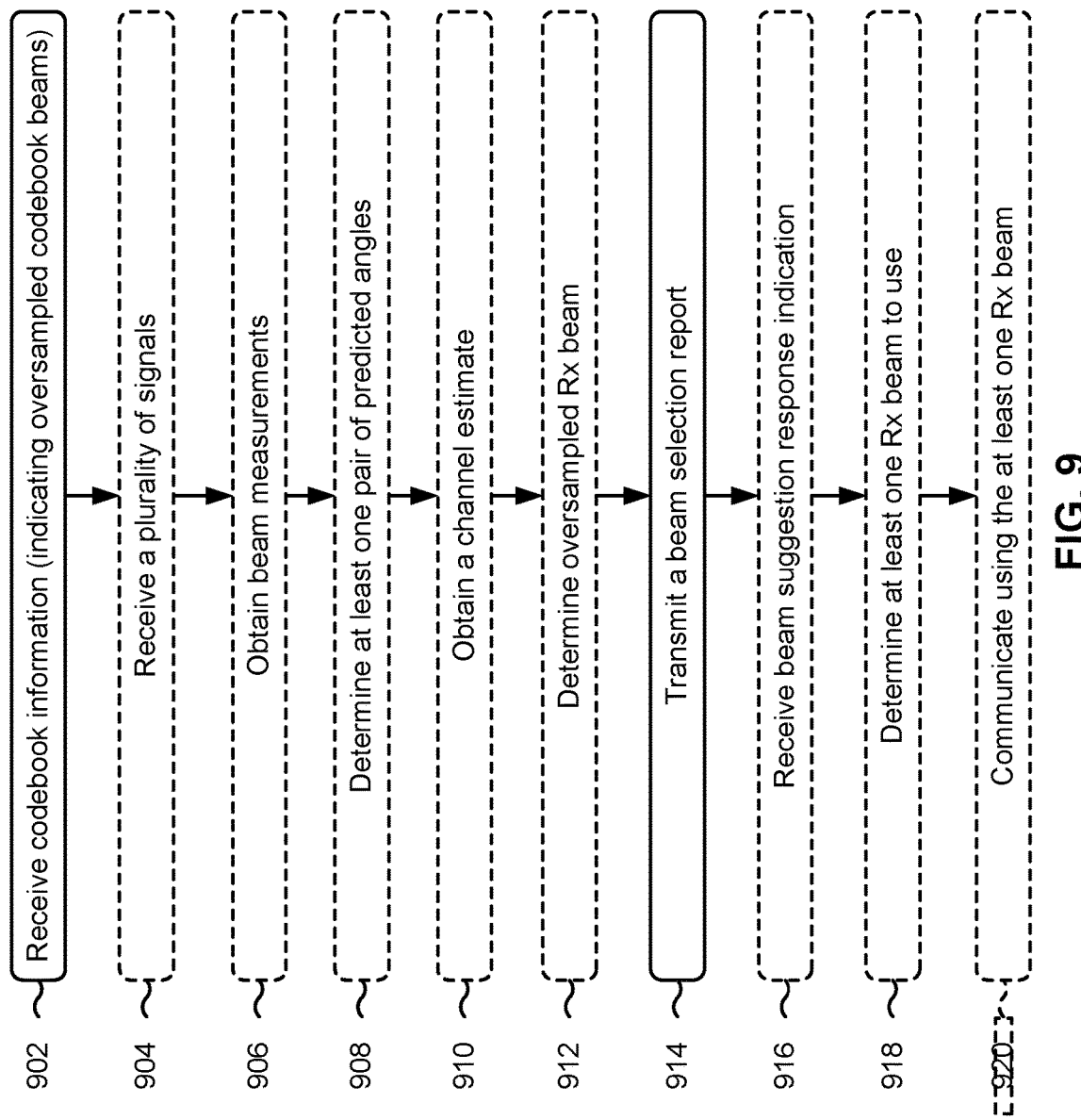

900

902 Receive codebook information (indicating oversampled codebook beams)

904 Receive a plurality of signals

906 Obtain beam measurements

908 Determine at least one pair of predicted angles

910 Obtain a channel estimate

912 Determine oversampled Rx beam

914 Transmit a beam selection report

916 Receive beam suggestion response indication

918 Determine at least one Rx beam to use

920 Communicate using the at least one Rx beam

FIG. 9

BEAM SELECTION USING OVERSAMPLED BEAMFORMING CODEBOOKS AND CHANNEL ESTIMATES

INTRODUCTION

Aspects of the present disclosure generally relate to wireless communication and to techniques and apparatuses for analog beamforming for millimeter wave communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a first network node for wireless communication includes a memory, and one or more processors, coupled to the memory. The one or more processors are configured to receive, from a second network node, codebook information that indicates a plurality of beams associated with an oversampled transmitter network node beamforming codebook. The one or more processors also are configured to transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

In some aspects, a first network node for wireless communication includes a memory, and one or more processors, coupled to the memory. The one or more processors are configured to cause the first network node to receive, from a second network node, codebook information that indicates a plurality of beams associated with an oversampled transmitter network node beamforming codebook. The one or more processors also are configured to cause the first network node to transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

In some aspects, a first network node for wireless communication includes a memory, and one or more processors coupled to the memory. The one or more processors are configured to transmit, to a second network node, codebook information that indicates a plurality of beams associated with an oversampled transmitter network node beamforming codebook. The one or more processors also are configured to receive a beam selection report that indicates at least one suggested transmission beam associated with the oversampled transmitter network node beamforming codebook.

In some aspects, a first network node for wireless communication includes a memory, and one or more processors coupled to the memory. The one or more processors are configured to cause the first network node to transmit, to a second network node, codebook information that indicates a plurality of beams associated with an oversampled transmitter network node beamforming codebook. The one or more processors also are configured to cause the first network node to receive a beam selection report that indicates at least one suggested transmission beam.

In some aspects, a method of wireless communication performed by a first network node includes receiving, from a second network node, codebook information that indicates a plurality of beams associated with an oversampled transmitter network node beamforming codebook. The method also includes transmitting a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

In some aspects, a method of wireless communication performed by a first network node includes transmitting, to a second network node, codebook information that indicates a plurality of beams associated with an oversampled transmitter network node beamforming codebook. The method also includes receiving a beam selection report that indicates at least one suggested transmission beam associated with the oversampled transmitter network node beamforming codebook.

In some aspects, a non-transitory computer-readable medium storing a set of instructions for wireless communication includes one or more instructions that, when executed by one or more processors of a first network node, cause the first network node to receive, from a second network node, codebook information that indicates a plurality of beams associated with an oversampled transmitter network node beamforming codebook. The instructions, when executed by one or more processors of a first network node, cause the first network node to transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

In some aspects, a non-transitory computer-readable medium storing a set of instructions for wireless communication includes one or more instructions that, when executed by one or more processors of a first network node, cause the first network node to: transmit, to a second network node, codebook information that indicates a plurality of beams associated with an oversampled transmitter network node beamforming codebook. The instructions, when executed by one or more processors of a first network node, cause the first network node to receive a beam selection report that indicates at least one suggested transmission beam associated with the oversampled transmitter network node beamforming codebook.

In some aspects, an apparatus for wireless communication includes means for receiving, from a network node, codebook information that indicates a plurality of beams associated with an oversampled transmitter network node beamforming codebook. The apparatus also includes means for transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

In some aspects, an apparatus for wireless communication includes means for transmitting, to a network node, codebook information that indicates a plurality of beams associated with an oversampled transmitter network node beamforming codebook. The apparatus also includes means for receiving a beam selection report that indicates at least one suggested transmission beam associated with the oversampled transmitter network node beamforming codebook.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process associated beam selection using oversampled beamforming codebooks and channel estimates, in accordance with the present disclosure.

DETAILED DESCRIPTION

Figure 1:
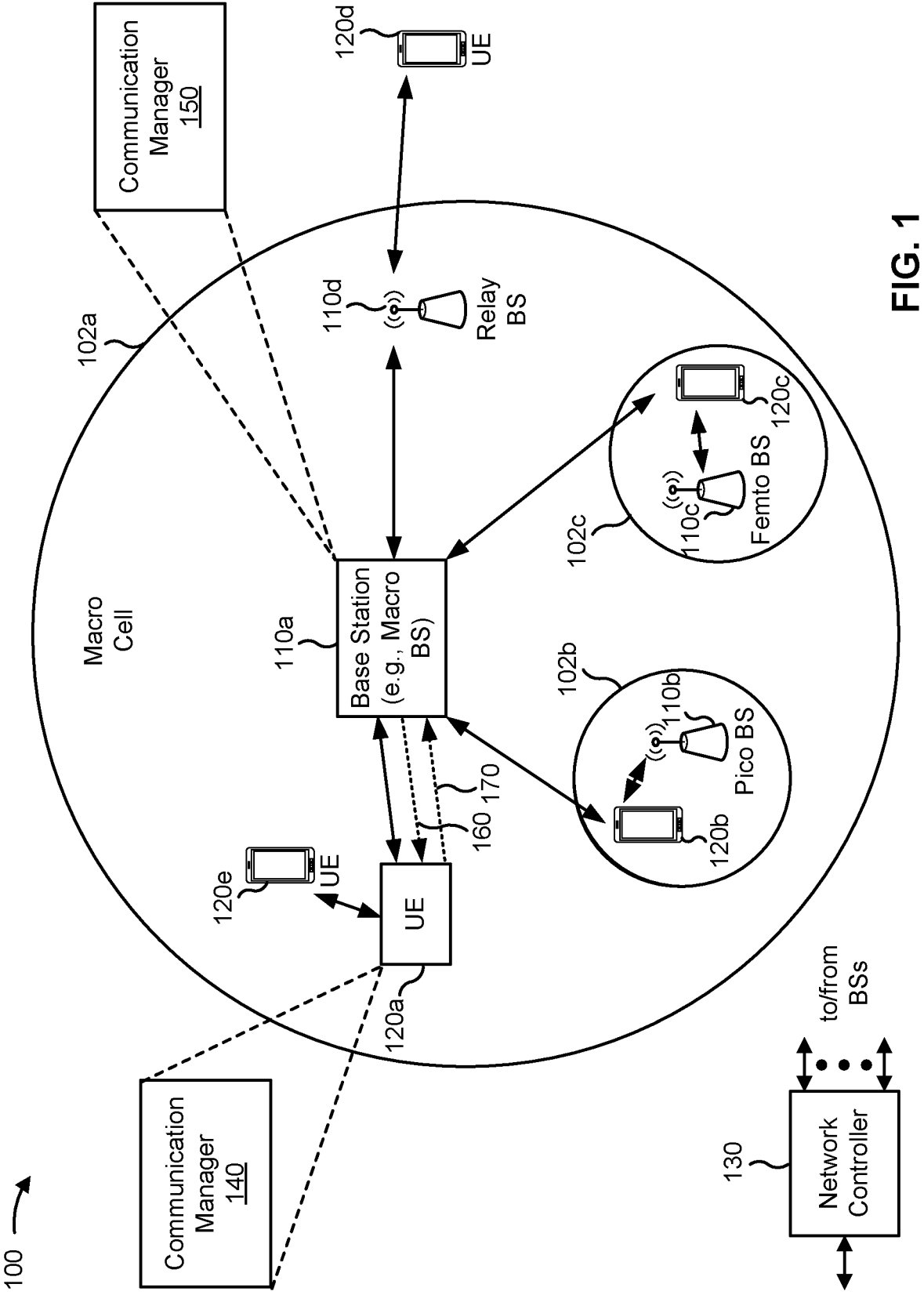
FIG. 1 is a diagram illustrating an example of a wireless network, in accordance with the present disclosure.

To support millimeter wave (mmW) communications, network nodes may be outfitted with antenna arrays having the capability to generate beams and perform beamforming. "Beam" may refer to a directional transmission such as a wireless signal that is transmitted in a direction of a receiver network node. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Analog beamforming is beamforming performed by analog circuit components that branch an analog signal, which has completed digital signal processing, into a plurality of paths, and forms a beam by setting a phase shift (PS) and a power amplifier (PA) in each path. Unlike analog beamforming, digital beamforming uses baseband processing to form beams at the digital stage to maximize diversity and multiplexing gain in a MIMO environment. Hybrid beamforming is beamforming that includes both an analog beamforming component and a digital beamforming component.

In some cases, a receiver network node and a transmitter network node can perform a beam management procedure in which the receiver network node and the transmitter network node identify beam pairs to be used for communication. The beam management procedure can include the transmitter network node performing beam sweeping over multiple transmit (Tx) beams and/or the receiver network node performing receive (Rx) beam sweeping over multiple Rx beams. The beam management procedure can enable the receiver network node to measure CSI-RSs on different transmit beams using different receive beams to support selection of transmitter network node transmit beams/receiver network node receive beam(s) beam pair(s). The beam pairs may be selected, for example, based on measurements of reference signal received power (RSRP).

In performing the beam management procedures described above, the receive and transmit beams are selected from respective beamforming codebooks (e.g., a receiver network node beamforming codebook and a transmitter network node beamforming codebook). A beamforming codebook includes a set of possible beamforming parameters that may be used to beamform a signal. The beamforming parameters may include, for example, phase shifts and/or amplitude coefficients and often are represented using beamforming weights. In some cases, the transmitter network node selects beams from a transmitter network node beamforming codebook and the receiver network node selects beams from a receiver network node beamforming codebook. However, in one example, the beamforming codebooks are not customized to the specific channel, as they are pre-defined codebooks configured to facilitate generation of pre-defined beams.

In some cases, a channel path of a channel cluster may facilitate a higher quality signal transmission and reception than any of the beams in a beamforming codebook. A channel cluster refers to a set of angles that includes an angle of departure (AoD) and an angle of arrival (AoA). The channel path of a channel cluster may refer to one or more directions associated with a spatial characteristic of the channel. For example, the channel path of the channel cluster may refer to the one or more directions corresponding to the AoA and/or the AoD. An AoA includes an azimuth angle and an elevation angle (sometimes referred to as a zenith angle). Similarly, an AoD includes an azimuth angle and an elevation angle (zenith angle).

Although an azimuth angle of arrival is sometimes denoted as "AoA" and a zenith angle of arrival is sometimes denoted as "ZoA," the term "AoA" in the present disclosure means "angle of arrival" and is intended to refer to one or more aspects of an angle of arrival such as, for example, an azimuth angle of arrival, a zenith angle of arrival, or a combination of the azimuth angle of arrival and the zenith angle of arrival. To facilitate clarity of the description, "azimuth angle of arrival" is denoted herein as "AaoA" and "zenith angle of arrival" is denoted herein as "AzoA." Similarly, although a zenith angle of departure is sometimes denoted as "AoD" and a zenith angle of departure is sometimes denoted as "ZoD," the term "AoD" in the present disclosure means "angle of departure" and is intended to refer to one or more aspects of an angle of departure such as, for example, an azimuth angle of departure, a zenith angle of departure, or the combination of the azimuth angle of departure and the zenith angle of departure. To facilitate clarity of the description, "azimuth angle of departure" is denoted herein as "AaoD" and "zenith angle of departure" is denoted herein as "AzoD."

In some cases, a beam pair (AoA and AoD) of a dominant channel cluster (e.g., a channel cluster having a highest RSRP) might facilitate a better communication channel than any of the beams indicated in the beamforming codebooks. In some aspects, the beam pair might facilitate selecting a beam from an oversampled beamforming codebook that may provide a better communication channel than any of the beams indicated in the beamforming codebooks. An oversampled beamforming codebook is a codebook that indicates beams corresponding to an oversampled discrete Fourier transformation (DFT) channel representation. Additionally, selecting an oversampled codebook beam suggested by a receiver network node that has estimated the channel may result in an improved beam pair for transmission, as compared to selecting a beam pair from a codebook based on reported RSRP measurements. To use a beam that is not indicated in a beamforming codebook, a receiver network node should determine an estimate of the channel so that a direction associated with a dominant channel cluster can be extracted. In some cases, determining an estimate of a channel is done by beam sweeping over an entire oversampled beamforming codebook (a codebook that is oversampled in the frequency domain). However, sweeping over an entire oversampled codebook for each channel estimate can generate unnecessary overhead and result in power consumption, as an oversampled codebook often indicates a large number of beams.

Some aspects of the techniques and apparatuses described herein may facilitate beam selection using oversampled beamforming codebooks and channel estimates. In some aspects, beams may be selected from an oversampled beamforming codebook based on a channel estimate. For example, in some aspects, a receiver network node may use observations about analog beamformed channels to determine a channel estimate of the underlying channel. The estimate of the underlying channel may be used to predict at least one pair of angles, which may be used to select and/or suggest beams to facilitate beamforming.

In some aspects, instead of beam sweeping over an entire oversampled beamforming codebook to estimate the channel, a receiver network node may use only codebook beams in connection with a sparse recovery operation to estimate the channel. A sparse recovery procedure is an algorithmic procedure that facilitates a lower dimension observation of higher dimension variables. For example, in some cases, a sparse recovery procedure can be used when a high dimension variable (e.g., a variable with a large number of features such angular features of a channel) is sparse. In some aspects, for example, it has been observed that, in the delay tap domain, a mmW channel is sparse because the channel includes only a small number (e.g., two or three) of dominant channel clusters. The delay tap domain refers to a time domain defined according to a series of delay taps (e.g., measurement points), separated by a delay, $\tau$, along a delay line associated with the channel. In the delay tap domain, the $d^{th}$ delay tap of the channel represents a channel cluster and is a sum of the delay taps, each of which may be represented by a channel path. Thus, the receiver network node may use the sparse recovery procedure to estimate a mmW channel based on a relatively small set of measurements. Because the receiver network node does not have to sweep over the over-sampled codebook, some aspects may facilitate overhead reduction and power savings at the receiver network node, while improving throughput In this way, some aspects of the present disclosure may facilitate communication using a better angular resolution for AoA(s) and AoD(s) at the transmitter network node and the receiver network node. In some aspects, the channel estimate may enable the receiver network node to suggest a beam associated with an oversampled transmitter network node beamforming codebook. Using oversampled codebook beams may improve spectral efficiency. Improved angular resolution and spectral efficiency may facilitate more efficient communications with higher throughput, thereby resulting in a positive impact on network performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced, using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

A telecommunication system may include, for example, a radio access network (RAN) that utilizes one or more aspects of one or more radio access technologies (RATs), as described herein. For example, in some cases, a RAN may include an open RAN (O-RAN), a RAN specified in a wireless communication standard such as a standard produced by the Third Generation Partnership Project (3GPP), and/or any other RAN or access technology that may facilitate interactions between one or more network nodes via a communication network that includes wireless communications.

As described herein, a network node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. A network node may be, or include, hardware, software, or a combination of hardware and software. As an example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the term "receive" and its conjugates (e.g., "receiving" and/or "received," among other examples) may be alternatively referred to as "obtain" or its respective conjugates (e.g., "obtaining" and/or "obtained," among other examples). Similarly, the term "transmit" and its conjugates (e.g., "transmitting" and/or "transmitted," among other examples) may be alternatively referred to as "provide" or its respective conjugates (e.g., "providing" and/or "provided," among other examples), "generate" or its respective conjugates (e.g., "generating" and/or "generated," among other examples), and/or "output" or its respective conjugates (e.g., "outputting" and/or "outputted," among other examples.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a ULE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first network node may be a receiver network node and may include a communication manager 140 or a communication manager 150. As described in more detail elsewhere herein, the communication manager 140 or 150 may receive, from a second network node, codebook information that indicates a plurality of beams associated with an oversampled transmitter network node beamforming codebook; and transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook. For example, the first network node may be the UE 120a and, as shown by reference number 160, the UE 120a may receive codebook information from the base station 110a. As shown by reference number 170, the UE 120a may transmit a beam selection report to the base station 110a.

As described in more detail elsewhere herein, the first network node may be a transmitter network node and the communication manager 140 or 150 may transmit, to a second network node, codebook information that indicates a plurality of beams associated with an oversampled transmitter network node beamforming codebook; and receive a beam selection report that indicates at least one suggested transmission beam associated with the oversampled transmitter network node beamforming codebook. Additionally, or alternatively, the communication manager 140 or 150 may perform one or more other operations described herein.

As indicated above, FIG. 1 is provided as an example. Other examples may differ from what is described with regard to FIG. 1.

Figure 2:
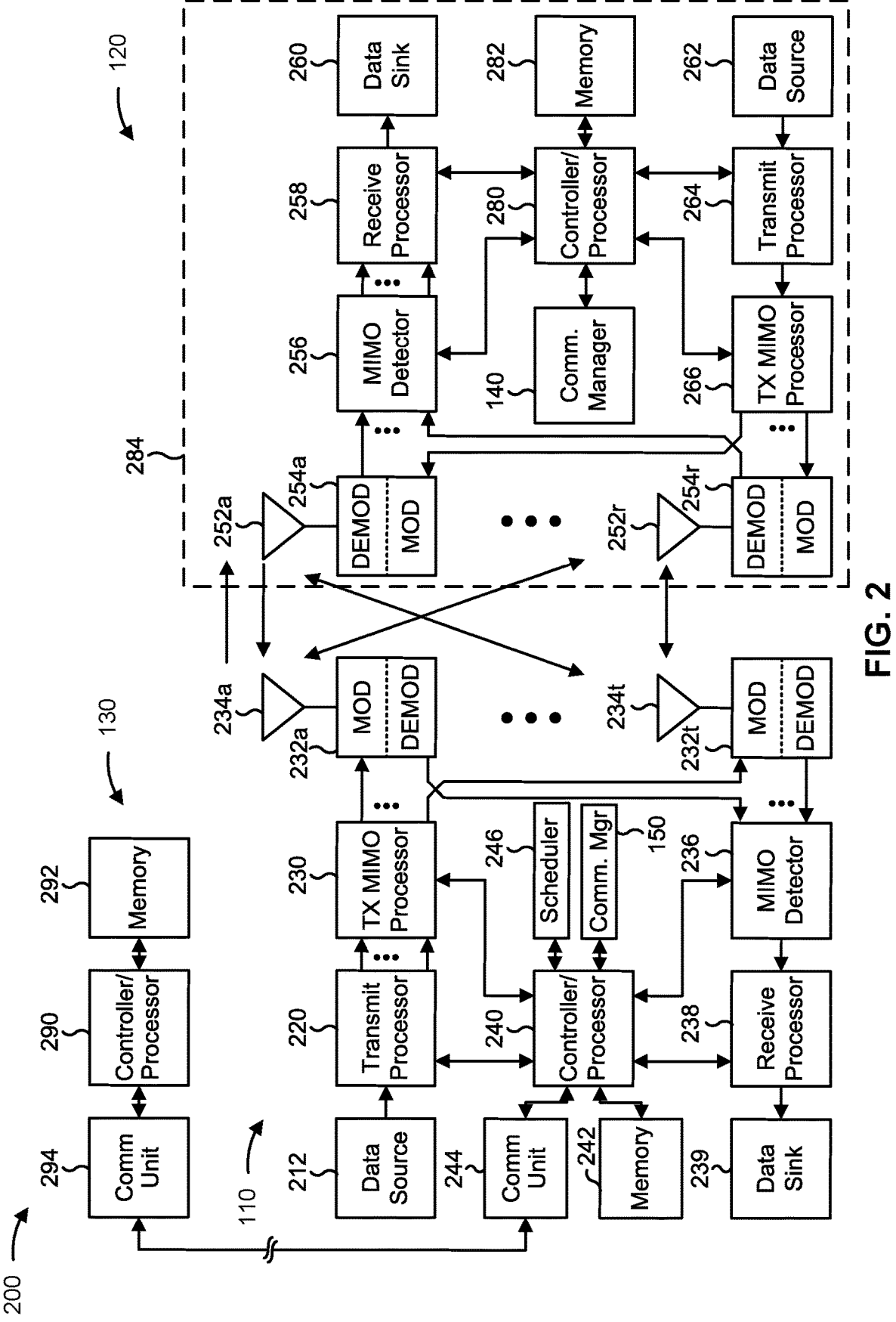
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network entity," or "network node" may refer to an aggregated base station, a disaggregated base station, an integrated access backhaul (IAB) node, a relay node, and/or one or more components thereof. For example, in some aspects, "base station," "network entity," or "network node" may refer to a CU, a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network entity," or "network node" may refer to one device configured to perform one or more functions, such as those described herein in connection with the base station 110. In some aspects, the term "base station," "network entity," or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network entity," or "network node" may refer to any one or more of those different devices. In some aspects, the term "base station," "network entity," or "network node" may refer to one or more virtual base stations and/or one or more virtual base station functions. For example, in some aspects, two or more base station functions may be instantiated on a single device. In some aspects, the term "base station," "network entity," or "network node" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine an RSRP parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

Some UEs and/or base stations may support full duplex operation in which the UEs and/or the base stations support full duplex operations. For example, a UE may support transmission via a first beam (e.g., using a first antenna panel) and may simultaneously support reception via a second beam (e.g., using a second antenna panel). Support for simultaneous transmission and reception may be conditional on beam separation, such as spatial separation (e.g., using different beams), frequency separation, and/or the like. Additionally, or alternatively, support for simultaneous transmission may be conditional on using beamforming (e.g., in frequency range 2 (FR2), in frequency range 4 (FR4), for millimeter wave signals, and/or the like).

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with beam selection using oversampled beamforming codebooks and channel estimates, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a first network node includes means for receiving, from a second network node, codebook information that indicates a plurality of beams associated with an oversampled transmitter network node beamforming codebook; and/or means for transmitting a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

In some aspects, the first network node includes means for transmitting, to a second network node, codebook information that indicates a plurality of beams associated with an oversampled transmitter network node beamforming codebook; and/or means for receiving a beam selection report that indicates at least one suggested transmission beam associated with the oversampled transmitter network node beamforming codebook. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
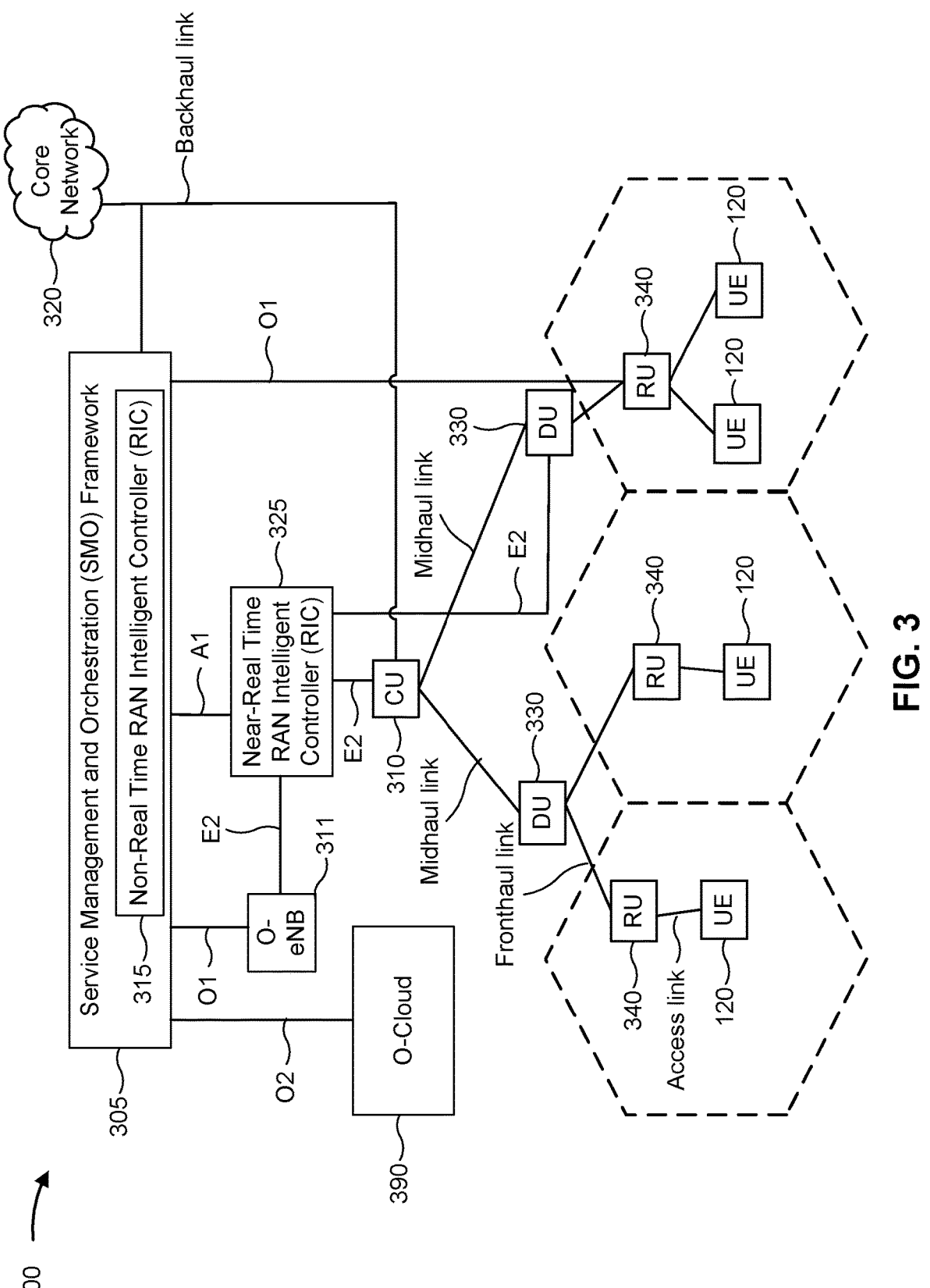
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a "network node" may refer to a network entity, a mobility element of a network, a RAN node, a core network node, a network element, or a network equipment, such as a base station (BS, e.g., base station 110), or one or more units (or one or more components) performing base station functionality and may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an JAB network, an O-RAN (such as the network configuration sponsored by the O-RAN Alliance), or a virtualized radio access network (vRAN), also known as a cloud radio access network (C-RAN). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more RF access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4A:
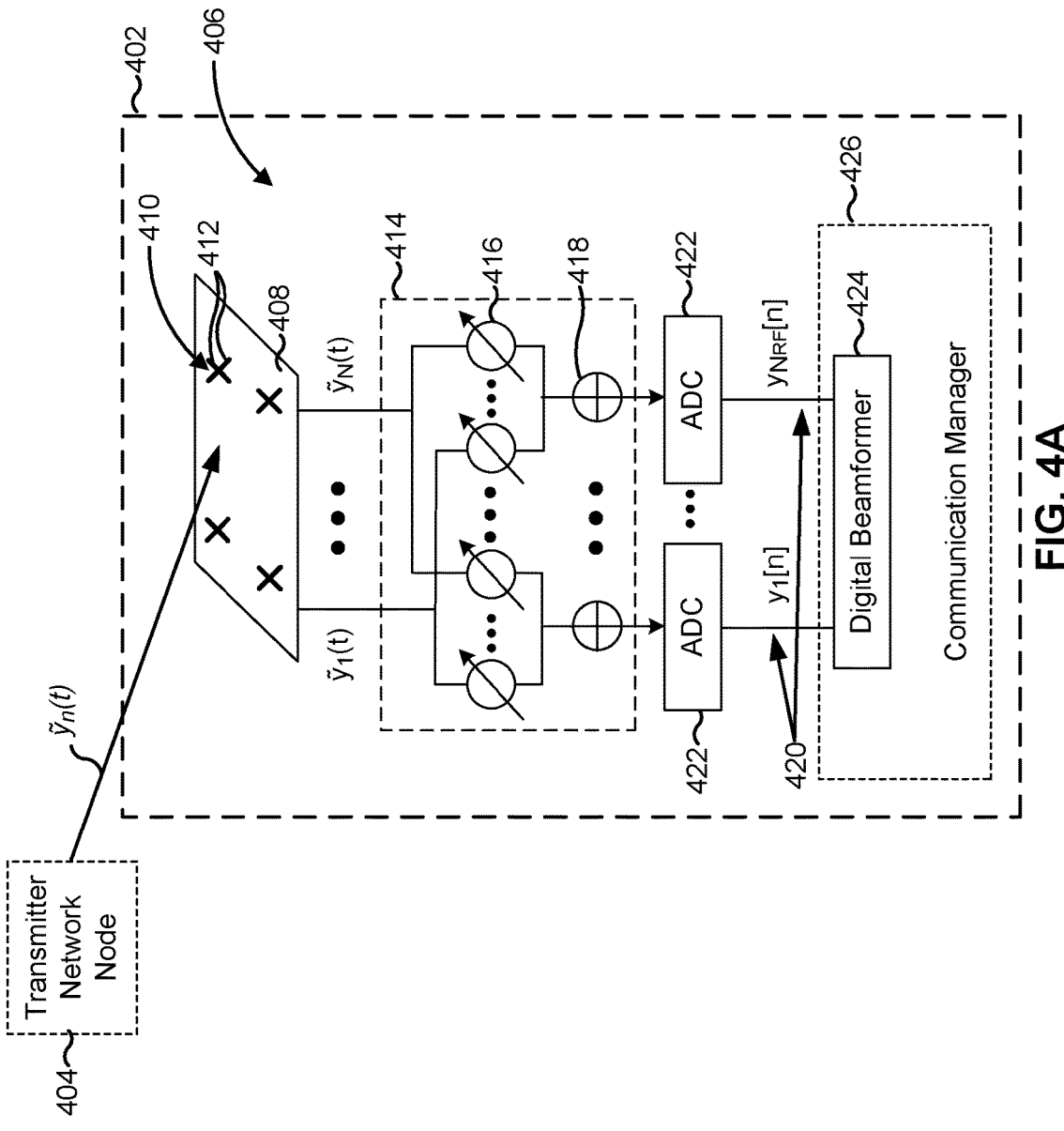
FIG. 4A is a diagram illustrating an example of analog beamforming for millimeter wave communications, in accordance with the present disclosure.
Figure 4B:
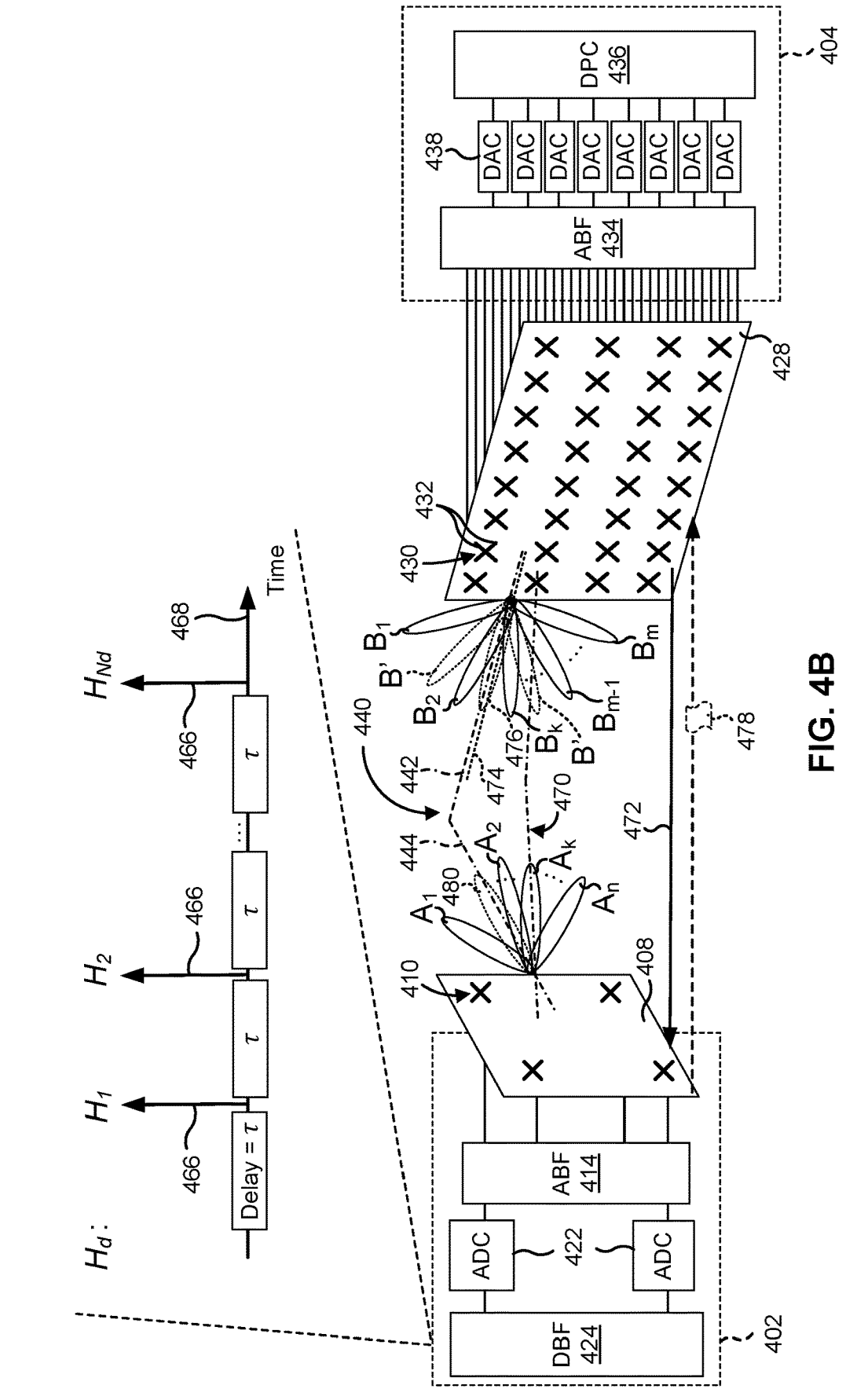
FIG. 4B is a diagram illustrating an example of analog beamforming for millimeter wave communications, in accordance with the present disclosure.

FIGS. 4A and 4B are diagrams illustrating an example 400 of analog beamforming for millimeter wave communications, in accordance with the present disclosure. As shown, a receiver network node 402 and a transmitter network node 404 may communicate with one another.

As shown in FIG. 4A, the receiver network node 402 may include a beamforming architecture 406. In some aspects, the architecture 406 may implement aspects of wireless network 100. For example, the architecture 406 may show receive chains (e.g., RF chains) for reception of communications by the receiver network node 402. The architecture 406 may be particularly useful for communication in a millimeter wave range, such as FR2 and/or the like.

Broadly, FIG. 4A is a diagram illustrating example hardware components of a wireless communication device in accordance with certain aspects of the disclosure. The illustrated components may include those that may be used for antenna element selection and/or for beamforming for reception of wireless signals. There are numerous architectures for antenna element selection and implementing phase shifting, only two examples of which are illustrated here. Transmission lines or other waveguides, wires, traces, and/or the like are shown connecting the various components to illustrate how signals to be transmitted may travel between components.

The architecture 406 includes a hybrid beamforming architecture. The architecture 406 includes an antenna array 408. The antenna array 408 includes N antenna elements 410. An antenna element 410 can include one or more sub-elements 412 for radiating or receiving RF signals. For example, a single antenna element 410 can include a first sub-element 412 cross-polarized with a second sub-element 412 that can be used to independently transmit or receive cross-polarized signals. The antenna elements 410 can include patch antennas, dipole antennas, or other types of antennas arranged in a linear pattern, a two-dimensional pattern, or another pattern. A spacing between antenna elements 410 can be such that signals with a desired wavelength transmitted separately by the antenna elements 410 can interact or interfere (e.g., to form a desired beam). For example, given an expected range of wavelengths or frequencies, the spacing may provide a quarter wavelength, half wavelength, or other fraction of a wavelength of spacing between neighboring antenna elements 410 to allow for interaction or interference of signals transmitted by the separate antenna elements 410 within that expected range.

A signal $\tilde{y}_n(t)$ received at an antenna element n at a time t can propagate to an analog beamformer 414 (referred to interchangeably as an "AFB"). The analog beamformer 414 can include a plurality of phase shifters 416 and one or more amplifiers 418 (e.g., one amplifier 418 per RF chain, multiple amplifiers 418 per RF chain, or one amplifier 418 for multiple RF chains). The architecture 406 includes a plurality of RF chains 420 (e.g., $N_{RF}$ RF chains). $N_{RF}$ may be smaller than N (e.g., the number of RF chains 420 may be smaller than the number of antenna elements of the architecture 406). In some examples, $N_{RF}$ may be 2 or 4. An architecture including a plurality of RF chains 420 and analog phase shifters 416 and amplifiers 418 can be referred to as a hybrid beamforming architecture. An architecture including a single RF chain (e.g., $N_{RF}=1$) may be referred to as an analog beamforming architecture.

Each RF chain 420 of architecture 406 can be associated with a respective analog-to-digital converter (ADC) 422. The ADCs 422 of the RF chains 420 can perform analog-to-digital conversion of the signals received from the analog beamformer 414. The ADCs 422 provide digital signals y1[n] through $y_{N_{RF}}[n]$ to a digital beamformer 424 (referred to interchangeably as a "DBF"). The digital beamformer 424 can be implemented at the baseband or can interface with a baseband processor. The digital beamformer 424 may perform digital-domain signal processing, such as digital baseband processing, controlling operation of components 408/410/412/414/416/418/420/422, spatial configuration of the communication of the receiver network node 402, and so on.

In some aspects, the digital beamformer 424 can be a component of a communication manager 426. The communication manager 426 can be, be similar to, include, or be included in, the communication manager 140 depicted in FIGS. 1 and 2, the communication manager 150 depicted in FIGS. 1 and 2, and/or the communication manager 1108 depicted in FIG. 11.

As shown in FIG. 4B, the transmitter network node 404 includes an antenna array 428. The antenna array 428 can include M antenna elements 430. Each antenna element 430 may include one or more sub-elements 432. The transmitter network node 404 can include an analog beamformer 434 and a digital beamformer 436 connected to the analog beamformer 434 via one or more digital-to-analog converters (DACs) 438.

To facilitate mmW communications, the receiver network node 402 and the transmitter network node 404 can perform a beam management procedure in which the receiver network node 402 and the transmitter network node 404 identify beam pairs to be used for communication. In some cases, for example, the receiver network node 402 and the transmitter network node 404 can perform beam management.

For example, the receiver network node 402 and the transmitter network node 404 can perform a first beam management procedure. The first beam management procedure can be referred to as a "P1" procedure, a beam selection procedure, an initial beam acquisition procedure, a beam sweeping procedure, a cell search procedure, and/or a beam search procedure. In the first beam management procedure, channel state information (CSI)-reference signals (CSI-RSs) can be configured to be transmitted from the transmitter network node 404 to the receiver network node 402. The first beam management procedure can include the transmitter network node 404 performing beam sweeping over multiple Tx beams (shown as "$B_1$," "$B_2$," . . . "$B_k$," . . . "$B_{m-1}$," and "$B_m$"). The transmitter network node 404 can transmit a CSI-RS using each transmit beam for beam management. To enable the receiver network node 402 to perform Rx beam sweeping, the transmitter network node 404 can use a transmit beam to transmit (e.g., with repetitions) each CSI-RS at multiple times within the same RS resource set so that the receiver network node 402 can sweep through receive beams in multiple transmission instances. As a result, the first beam management procedure can enable the receiver network node 402 to measure a CSI-RS on different transmit beams using different receive beams to support selection of a pair of beams that includes a transmission beam and a reception beam. The receiver network node 402 can report the measurements to the transmitter network node 404 to enable the transmitter network node 404 to select one or more beam pair(s) for communication between the transmitter network node 404 and the receiver network node 402. In some cases, the first beam management process can also use synchronization signal blocks (SSBs) for beam management in a similar manner as described above.

In some cases, the receiver network node 402 and the transmitter network node 404 can perform a second beam management procedure. The second beam management procedure can be referred to as a "P2" beam management procedure, a beam refinement procedure, a base station beam refinement procedure, a TRP beam refinement procedure, and/or a transmit beam refinement procedure. In the second beam management procedure, CSI-RSs can be configured to be transmitted from the transmitter network node 404 to the receiver network node 402. The second beam management procedure can include the transmitter network node 404 performing beam sweeping over one or more transmit beams. The one or more transmit beams can be a subset of all transmit beams associated with the transmitter network node 404 (e.g., determined based at least in part on measurements reported by the receiver network node 402 in connection with the first beam management procedure). The transmitter network node 404 can transmit a CSI-RS using each transmit beam of the one or more transmit beams for beam management. The receiver network node 402 can measure each CSI-RS using a single (e.g., a same) receive beam (e.g., determined based at least in part on measurements performed in connection with the first beam management procedure). The second beam management procedure can enable the transmitter network node 404 to select a transmit beam based at least in part on measurements of the CSI-RSs (e.g., measured by the receiver network node 402 using the single receive beam) reported by the receiver network node 402.

In some cases, the receiver network node 402 and the transmitter network node 404 can perform a third beam management procedure. The third beam management procedure can be referred to as a "P3" beam management procedure, a beam refinement procedure, a UE beam refinement procedure, and/or a receive beam refinement procedure. In a third beam management procedure, one or more CSI-RSs can be configured to be transmitted from the transmitter network node 404 to the receiver network node 402. The third beam management procedure can include the transmitter network node 404 transmitting the one or more CSI-RSs using a single transmit beam (e.g., determined based at least in part on measurements reported by the receiver network node 402 in connection with the first beam management procedure and/or the second beam management procedure). To enable the receiver network node 402 to perform receive beam sweeping, the transmitter network node 404 can use a transmit beam to transmit (e.g., with repetitions) CSI-RS at multiple times within the same RS resource set so that receiver network node 402 can sweep through one or more receive beams in multiple transmission instances. The one or more receive beams can be a subset of all receive beams associated with the receiver network node 402 (e.g., determined based at least in part on measurements performed in connection with the first beam management procedure and/or the second beam management procedure). The third beam management procedure can enable the transmitter network node 404 and/or the receiver network node 402 to select a best receive beam based at least in part on reported measurements received from the receiver network node 402 (e.g., of the CSI-RS of the transmit beam using the one or more receive beams).

In performing the beam management procedures described above, the receive and transmit beams are selected from respective beamforming codebooks. For example, to determine receive beams to use, the receiver determines a hybrid beamforming signal estimate, y, based on a hybrid beamforming input-output relationship per tone that is expressed as y in terms of a variable, x, and a variable, n:

$$y = AHBPx + n,$$

where, A is an Rx analog beamforming matrix, H is a raw channel matrix, B is a Tx analog beamforming matrix, and P is a Tx digital precoding matrix. The Rx analog beamforming matrix A is a linear transform and the size of the matrix A is $N_{RP} \times N_{Rx}$, where $N_{RP}$ is the number of RF chains in the receiver, and $N_{Rx}$ is the number of receive antennas. The size of the raw channel matrix H is $N_{Rx} \times N_{Tx}$, where $N_{Rx}$ is the number of receive antennas and $N_{Tx}$ is the number of transmit antennas. The raw channel matrix H is a function of core parameters including, for example, per-cluster AoA and AoD delays, and gains. The size of the Tx analog beamforming matrix B is $N_{Tx} \times N_{TP}$, where $N_{TP}$ is the number of RF chains at the transmitter and $N_{Tx}$ is the number of transmit antennas. The size of the Tx digital precoding matrix is $N_{TP} \times N_{SS}$, where $N_{SS}$ is the number of spatial streams.

In the beamforming procedures described above, A and B are chosen from analog beamforming codebooks, which can include sets of phase shifts to apply to antenna elements and/or amplitude coefficients. A is chosen by the receiver network node 402 and B and P are chosen by the transmitter network node 404. The transmitter network node 404 determines the beams to use (e.g., by choosing B and P), from a transmitter network node beamforming codebook, based on RSRP measurements reported by the receiver network node 402. However, the beamforming codebooks are may not be customized to the specific channel H, as they are pre-defined codebooks configured to facilitate generation of pre-defined beams. In some cases, a pair of corresponding angles (AoA and AoD) of the channel cluster 440 might facilitate a better communication channel than any of the beams indicated in the beamforming codebooks (e.g., beams B1-Bm).

Some aspects of the techniques and apparatuses described herein may facilitate beam selection using oversampled beamforming codebooks and channel estimates. In some aspects, beams may be selected from an oversampled beamforming codebook based on a channel estimate. For example, in some aspects, a receiver network node may use observations about analog beamformed channels to determine a channel estimate of the underlying channel (e.g., the raw channel represented by H). The estimate of the underlying channel may be used to predict at least one pair of angles, which may be used to select and/or suggest beams to facilitate beamforming.

Figure 4C:
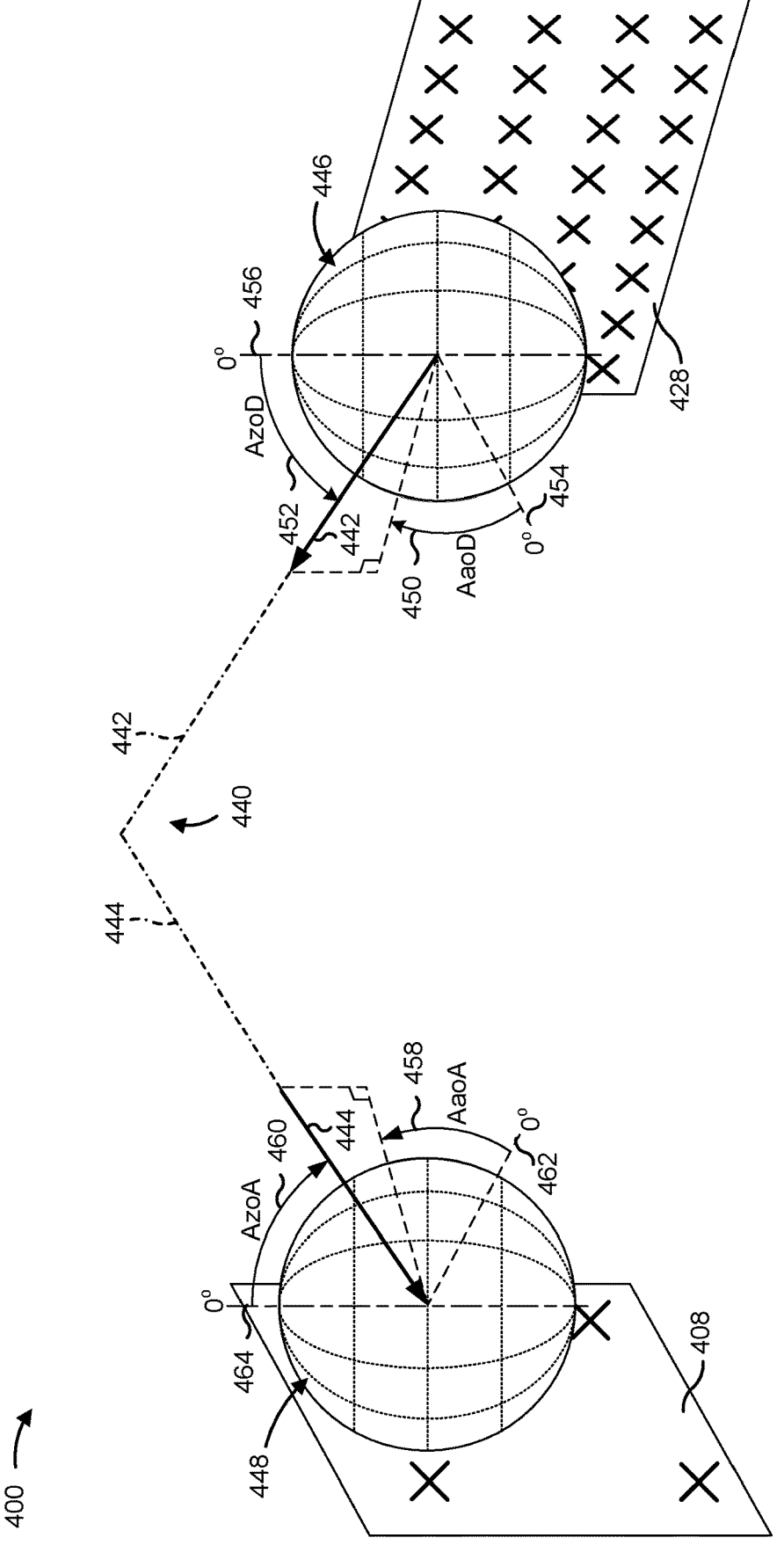
FIG. 4C is a diagram illustrating an example of analog beamforming for millimeter wave communications, showing an angle of departure (AoD) and an angle of arrival (AoA), in accordance with the present disclosure.

For example, as shown in FIGS. 4B and 4C, a channel cluster 440 is illustrated as a combination of a Tx path (represented by an AoD 442 and a gain along the AoD 442) and an Rx path (represented by an AoA 444 and a gain along the AoA 444). As shown in FIG. 4C, for example, the AoD 442 and AoA 444 may be represented in the context of a respective spherical coordinate system 446 or 448. In some examples, the coordinate system 446 and the coordinate system 448 may be the same system. In some other examples, the coordinate system 446 may be different than the coordinate system 448 (e.g., different in orientation and/or scale). As shown, the AoD 442 may include a path (e.g., a direction) determined by a combination of an AaoD 450 and an AzoD 452. The AaoD 450 may be an angle of azimuth defined with respect to an azimuthal axis 454, and the AzoD 452 may be an angle of zenith defined with respect to a zenith axis 456. Similarly, the AoA 444 may include a path (e.g., a direction) determined by a combination of an AaoA 458 and an AzoA 460. The AaoA 458 may be an angle of azimuth defined with respect to an azimuthal axis 462, and the AzoA 460 may be an angle of zenith defined with respect to a zenith axis 464.

The channel estimate may be obtained using a sparse recovery procedure that facilitates a lower dimension observation of higher dimension variables. For example, in example 400, the receiver network node 402 includes four dual-polarization antenna elements 410 and the transmitter network node 404 includes 32 dual-polarization antenna elements 430. Thus, the dimensionality of the channel H is 8×64. Since each 2×2 beam pair provides a beamformed observation of H, the dimensionality of the Rx analog beamforming matrix A is 2×8, and the dimensionality of the Tx analog beamforming matrix B is 64×2. Therefore, the dimensionality of the effective channel, AHB=(2×8)×(8×64)×(64×2)=2×2, which is a much smaller dimensionality than 8×64, the dimensionality of the channel H in the frequency domain.

However, the channel may be represented in the time domain (e.g., the delay tap domain). For example, as shown in FIG. 4B, the delay tap domain refers to a time domain defined according to a series of delay taps 466 (e.g., measurement points), separated by a delay, τ, along a delay line 468 associated with the channel. In the delay tap domain, the $d^{th}$ delay tap of the channel is composed of multiple channel clusters (e.g., up to L clusters). Each channel cluster (e.g., the channel cluster 440) is associated with an AoA/AoD pair (e.g., the AoA 444 and AoD 442) the corresponding gains along those angles. As described above, the AoA 444 and the AoD 442 each include angles of azimuth and angles of elevation. It has been observed that, in the delay tap domain, the channel is sparse because the channel includes only a small number (e.g., two or three) dominant channel clusters (illustrated as channel cluster 440 and channel cluster 470). Accordingly, the receiver network node 402 may recover the underlying channel using only a few beamformed measurements. The estimated channel may be used to facilitate beam selection without an unnecessary increase in overhead or power consumption since the underlying channel is estimated using a sparse recovery operation.

For example, as shown in FIG. 4B, the receiver network node 402 may receive codebook information 472 from the transmitter network node 404. The codebook information 472 may indicate a plurality of beams (shown as "B'") associated with an oversampled beamforming codebook. The receiver network node 402 may obtain a channel estimate without obtaining beam measurements associated with beams B' that are associated with the oversampled beamforming codebook. In some aspects, the receiver network node 402 may determine at least one predicted AoD 474 associated with a dominant channel cluster (e.g., channel cluster 440) based at least in part on the channel estimate. In some aspects, the receiver network node 402 also may determine at least one predicted AoA (not shown) associated with the dominant channel cluster. The receiver network node 402 may determine at least one suggested transmission beam 476 and/or at least one suggested reception beam. In some aspects, the receiver network node 402 may determine the suggested beam(s) 476 based at least in part on the channel estimate, the at least one predicted AoD and/or the at least one predicted AoA. As shown, the receiver network node 402 may transmit a beam selection report 478 that indicates at least one suggested transmission beam 476.

In some aspects, the channel estimate may enable the receiver network node 402 to suggest a beam 476 associated with an oversampled transmitter network node beamforming codebook. Using oversampled codebook beams B' may improve spectral efficiency and/or angular resolution (e.g., the ability of the network node 402 to discern AoAs) as compared to using codebook beams (e.g., A1-An or B1-Bm). Improved angular resolution and spectral efficiency may facilitate more efficient communications with higher throughput, thereby resulting in a positive impact on network performance.

As indicated above, FIGS. 4A and 4B are provided as examples. Other examples may differ from what is described with regard to FIGS. 4A and 4B.

Figure 5:
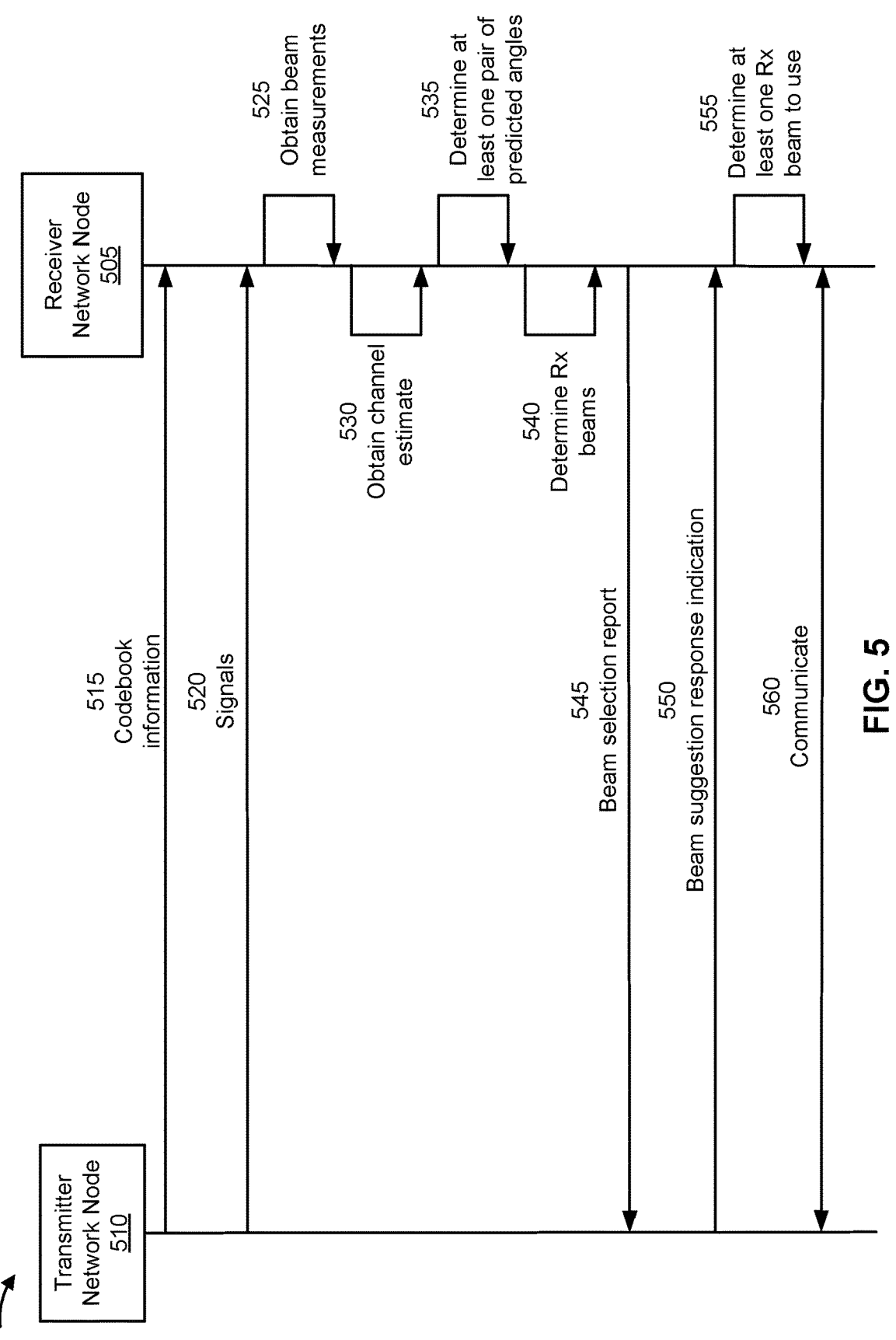
FIG. 5 is a diagram illustrating an example associated with beam selection using oversampled beamforming codebooks and channel estimates, in accordance with the present disclosure.

FIG. 5 is a diagram illustrating an example 500 associated with beam selection using oversampled beamforming codebooks and channel estimates, in accordance with the present disclosure. As shown in FIG. 5, a receiver network node 505 and a transmitter network node 510 may communicate with one another. The transmitter network node 510 may be, or be similar to, the transmitter network node 404 shown in FIGS. 4A and 4B and the receiver network node 505 may be, or be similar to, the receiver network node 402 shown in FIGS. 4A and 4B. In some aspects, the receiver network node 505 may be referred to as a "first network node" and the transmitter network node 510 may be referred to as a "second network node." In some other aspects, the transmitter network node 510 may be referred to as a "first network node" and the receiver network node 505 may be referred to as a "second network node."

As shown by reference number 515, the transmitter network node 510 may transmit, and the receiver network node 505 may receive, codebook information. The codebook information may indicate a plurality of beams associated with an oversampled transmitter network node beamforming codebook. As shown by reference number 520, the transmitter network node 510 may transmit, and the receiver network node 505 may receive, a plurality of signals. In some aspects, the plurality of signals may include at least one reference signal. The plurality of signals may be associated with a transmission beam of a plurality of transmission beams. The receiver network node 505 may receive the plurality of signals using at least one reception beam.

As shown by reference number 525, the receiver network node 505 may obtain a plurality of beam measurements associated with a plurality of transmission beams. The receiver network node 505 may obtain the plurality of beam measurements based at least in part on at least one reception beam used to receive the signal. The plurality of beam measurements may be associated with at least one beam pair, of a set of beam pairs. In some aspects, the receiver network node 505 may obtain measurements for a plurality of beam pairs. Each beam pair of the set of beam pairs may include a transmission beam of the plurality of transmission beams and a reception beam of the at least one reception beam. The at least one beam pair may correspond to a subset of RSRP measurements having largest RSRP values of a set of RSRP values associated with the set of beam pairs.

As shown by reference number 530, the receiver network node 505 may obtain a channel estimate. In some aspects, the receiver network node 505 may obtain the channel estimate based at least in part on a sparse recovery operation such as the sparse recovery operation described above. In some aspects, the receiver network node 505 may obtain the channel estimate without obtaining beam measurements associated with beams that are associated with an oversampled transmitter network node beamforming codebook and/or an oversampled receiver network node beamforming codebook. In some aspects, the receiver network node 505 may determine the channel estimate based at least in part on using one or more beam measurements of the plurality of beam measurements as inputs to the sparse recovery operation.

As shown by reference number 535, the receiver network node 505 may determine at least one pair of predicted angles. The at least one pair of predicted angles may include, for example, at least one predicted AoA and at least one predicted AoD. The at least one predicted AoA may include a predicted azimuth AoA and/or a predicted elevation AoA. The at least one predicted AoD may include a predicted azimuth AoD and/or a predicted elevation AoD. The at least one pair of predicted angles may be associated with a dominant channel cluster. The receiver network node 505 may determine the at least one pair of predicted angles based at least in part on a sparse recovery operation. The sparse recovery operation may include a machine learning operation or a compressed sensing operation. For example, in some aspects, the sparse recovery operation may be based at least in part on an orthogonal matching pursuit (OMP) procedure. The receiver network node 505 may determine the at least one pair of predicted angles based at least in part on performing the sparse recovery operation using the plurality of beam measurements as inputs to the sparse recovery operation.

As shown by reference number 540, the receiver network node 505 may determine reception beams. For example, the receiver network node 505 may determine a reception beam associated with an oversampled receiver network node beamforming codebook based at least in part on the channel estimate.

As shown by reference number 545, the receiver network node 505 may transmit, and the transmitter network node 510 may receive, a beam selection report. The beam selection report may indicate at least one suggested transmission beam associated with the oversampled transmitter network node beamforming codebook. The at least one suggested transmission beam may be based at least in part on the channel estimate. The at least one suggested transmission beam may be based at least in part on a mapping between the channel estimate and the oversampled transmitter network node beamforming codebook. The mapping may be based at least in part on a trained neural network. The at least one suggested transmission beam may be based at least in part on performing a grid search operation associated with the oversampled transmitter network node beamforming codebook.

As shown by reference number 550, the transmitter network node 510 may transmit, and the receiver network node 505 may receive, a beam suggestion response indication. The beam suggestion response indication may indicate whether the transmitter network node 510 will use the at least one suggested transmission beam. As shown by reference number 555, the receiver network node 505 may determine at least one reception beam to use. For example, in some aspects, the receiver network node 505 may determine to use a reception beam associated with an oversampled receiver network node beamforming codebook based at least in part on the beam suggestion response indication indicating that the transmitter network node 510 will use the suggested beam from the oversampled transmitter network node beamforming codebook.

As shown by reference number 560, receiver network node 505 and the transmitter network node 510 the transmitter network node 510 may communicate using the respective selected beams.

As indicated above, FIG. 5 is provided as an example. Other examples may differ from what is described with regard to FIG. 5.

As discussed above, in connection with FIG. 5, the receiver network node 505 may be configured to obtain a channel estimate and determine beams based at least in part on at least one pair of predicted angles based at least in part on signals received from the transmitter network node 510. To determine the at least one pair of predicted angles, the receiver network node 505 may be configured to use a sparse recovery operation to determine an estimate of the communication channel.

Figure 6A:
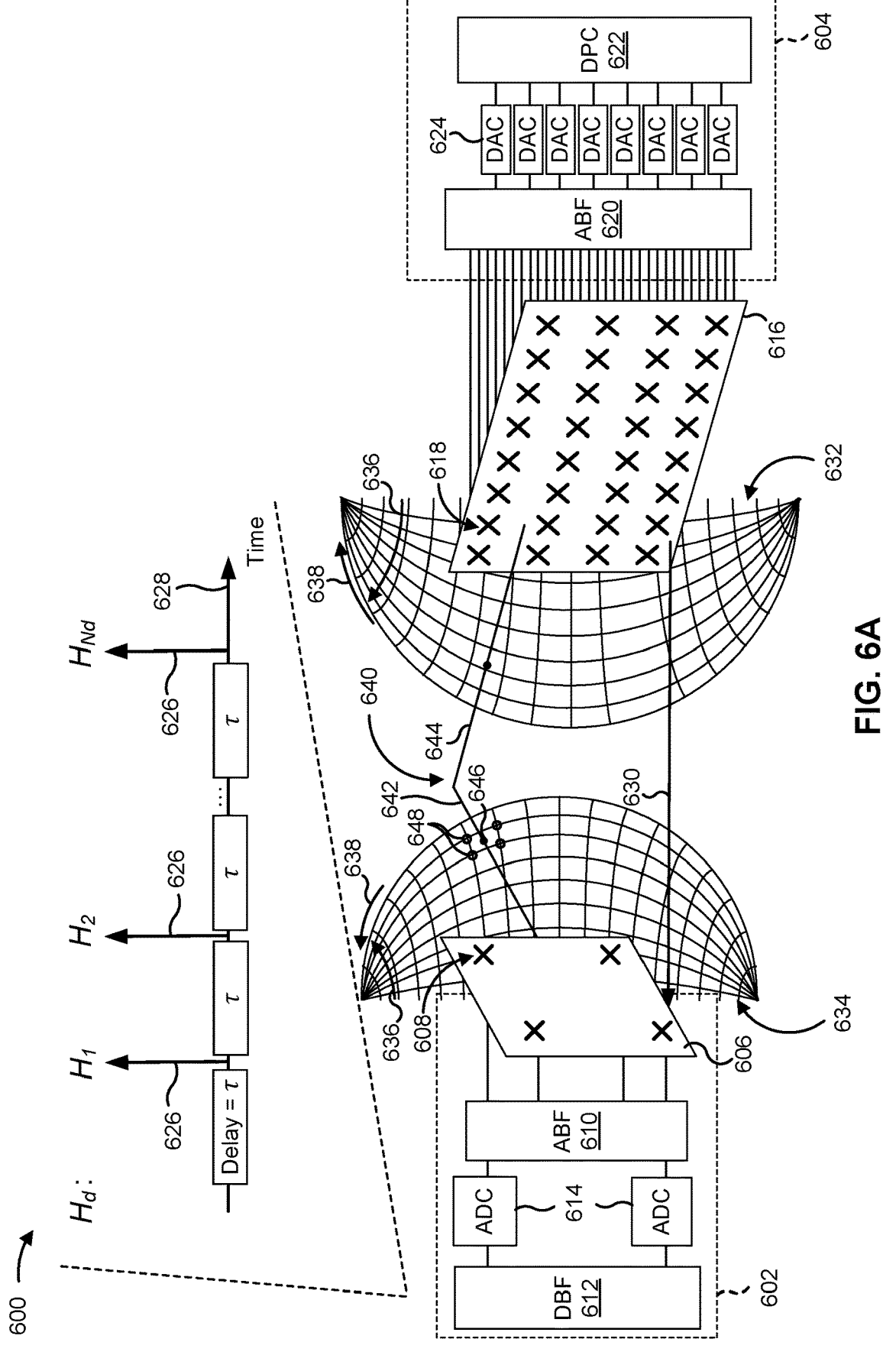
FIG. 6A is a diagram illustrating an example associated with using a sparse recovery operation to predict an angle of departure (AoD), in accordance with the present disclosure.
Figure 6B:
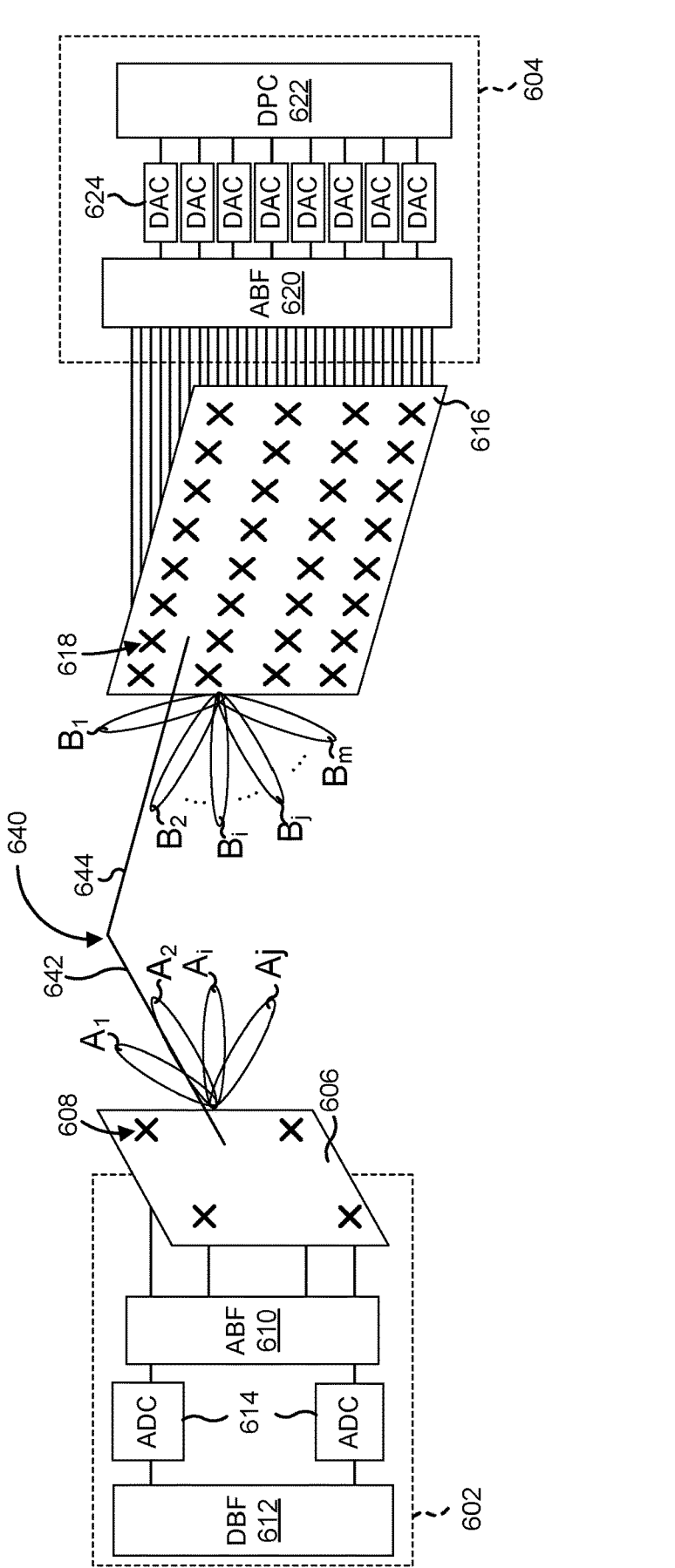
FIG. 6B is a diagram illustrating an example associated with using a sparse recovery operation to predict an AoD, in accordance with the present disclosure.

FIGS. 6A and 6B are diagrams illustrating an example 600 associated with using a sparse recovery operation to determine at least one predicted angle, in accordance with the present disclosure. As shown, a receiver network node 602 and a transmitter network node 604 may communicate with one another. In some aspects, the receiver network node 602 may be referred to as a "first network node" and the transmitter network node 604 may be referred to as a "second network node." In some other aspects, the transmitter network node 604 may be referred to as a "first network node" and the receiver network node 602 may be referred to as a "second network node." The receiver network node 602 may be, or be similar to, the receiver network node 505 depicted in FIG. 5 and/or the receiver network node 402 depicted in FIGS. 4A and 4B. The transmitter network node 604 may be, or be similar to, the transmitter network node 510 depicted in FIG. 5 and/or the transmitter network node 404 depicted in FIGS. 4A and 4B.

As shown, for example, the receiver network node 602 may include an antenna array 606. The antenna array 606 may include N antenna elements 608. The antenna array 606 may be connected to an analog beamformer ("ABF") 610, which may be connected to a DBF 612 via one or more ADCs 614. The transmitter network node 604 may include an antenna array 616. The antenna array 616 may include M antenna elements 618. The antenna array 616 may be connected to an analog beamformer ("ABF") 620, which may be connected to a digital precoder ("DPC") 622 via one or more DACs 624.

As shown, the receiver network node 602 may be configured to determine a channel estimate, $H_d$, for each $d^{th}$ delay tap 626 along a delay line 628 corresponding to a delay spread associated with a wireless communication channel H. In some aspects, the receiver network node 602 may include (e.g., stored in memory) a beamforming codebook that includes 4 beams and an oversampled codebook (oversampled in the spatial domain) that includes 16 beams. The transmitter network node 404 may include a beamforming codebook that includes 32 beams and an oversampled codebook that includes 128 beams. In some aspects, the transmitter network node 604 may transmit codebook information to the receiver network node 602 that indicates a plurality of beams associated with an oversampled transmitter network node beamforming codebook.

In some aspects, instead of beam sweeping over the entire oversampled beamforming codebook of the receiver network node 602 to estimate the channel, the receiver network node 602 may use only codebook beams in connection with a sparse recovery operation to estimate the channel. Because the receiver network node 602 does not have to sweep over the over-sampled codebook, some aspects may facilitate overhead reduction and power savings at the receiver network node 602, while improving throughput.

Based on the estimated channel, as explained above in connection with FIG. 5, the receiver network node 602 may predict at least one pair of predicted angles, which may be used by the receiver network node 602 to determine at least one suggested transmission beam based on the codebook information from the transmitter network node 604 and the estimated channel. The receiver network node 602 may indicate the at least one suggested beam to the transmitter network node 604 and the two network nodes 602 and 604 may communicate using selected beams.

To estimate the channel, the receiver network node 602 may receive a signal 630 from the transmitter network node 604. In some aspects, the signal 630 may represent a plurality of signals. The receiver network node 602 may use the signal 630 to perform the sparse recovery operation based at least in part on a geometric channel model for frequency-selective mmW channel consisting of L clusters.

A geometric channel model representation is a model of a channel in the delay tap domain. Thus, for example, determining an FFT of the channel in the tap domain results in a model of the channel in the frequency domain. If the channel has a total of $N_d$ taps, the $d^{th}$ delay tap of the channel (for d=1, 2, . . . , $N_d$) can be expressed as $$H_d = \Sigma_{l=1}^{L} \alpha_l s(dT_s - \tau_l) p_R(\theta_{R_l}, \phi_{R_l}) p_T^*(\theta_{T_l}, \theta_{T_l}),$$

where $\alpha_l$ is the complex gain of the $l^{th}$ channel cluster, $s(\tau)$ is a band-limited pulse shaping filter response evaluated at $\tau$, $p_R(\theta_R, \phi_{R_l})$ is a receiver antenna element response vector, and $p_T(\theta_{T_l}, \phi_{T_l})$ is a transmitter antenna element response vector.

The above equation can be re-written in the matrix form as follows:

$$H_d = \tilde{P}_R \Delta_d \tilde{P}_T^*,$$

where $\Delta_d$ is an [L×L] diagonal matrix with non-zero complex entries, $\tilde{P}_R$ is an $[N_{UEant} \times L]$ matrix including the receiver network node 602 antenna element 608 responses for L clusters, and $\tilde{P}_T$ is an $[N_{NBant} \times L]$ matrix including the transmitter network node 604 element responses for L clusters.

As shown in FIG. 6A, the receiver network node 602 may generate a quantized channel representation by using a first two-dimensional grid 632 to quantize the angular space at the transmitter network node 604 and a second two-dimensional grid 634 to quantize the angular space at the receiver network node 602. The grids 632 and 634 may be used to divide up the angular space. The dimensions of the grids 632 and 634 may be customizable. In the illustrated example, each grid is divided using 16 dimensions. In some aspects, the first network grid 632 may, for example, include 32 elevation dimensions and 64 azimuth dimensions. In the illustrated example, each grid 632 and 634 may be configured to divide the angular space from −180 degrees to 180 degrees in the azimuth direction 636 and from 0 degrees to 180 degrees in the elevation direction 638.

In some aspects, the illustrated grids 632 and 634 may be used to determine underlying H channels from multiple 2×2 AHB measurements. For example, a 128×128 grid and a 128×128 grid may correspond to a quantization based on the AoAs and AoDs, respectively. Then, the $d^{th}$ delay tap of the extended virtual channel model can be written as $$H_d \approx P_R \Delta_d^v P_T^*,$$

where $P_R$ is the receiver element response matrix evaluated at each grid point, $\Delta_d^v$ is a large sparse matrix in which the non-zero elements of the matrix represent the channel gains along certain angles, where the angles correspond to certain rows and columns of the matrix. Thus, for example, if a certain row and column of the $\Delta_d^v$ matrix is non-zero, there is a channel cluster along the associated angles and the gain of the channel cluster is denoted by the non-zero element. For example, the gain of the cluster 640 is the gain along an AoD 642 and an AoA 644. $P_T^*$ is the transmitter element response matrix evaluated at each grid point. Accordingly, the representation of equation 4 indicates that, for a given channel tap, the dimension of $H_d$ is 8×64, thus quantizing the channel in the angular domain.

Figure 6C:
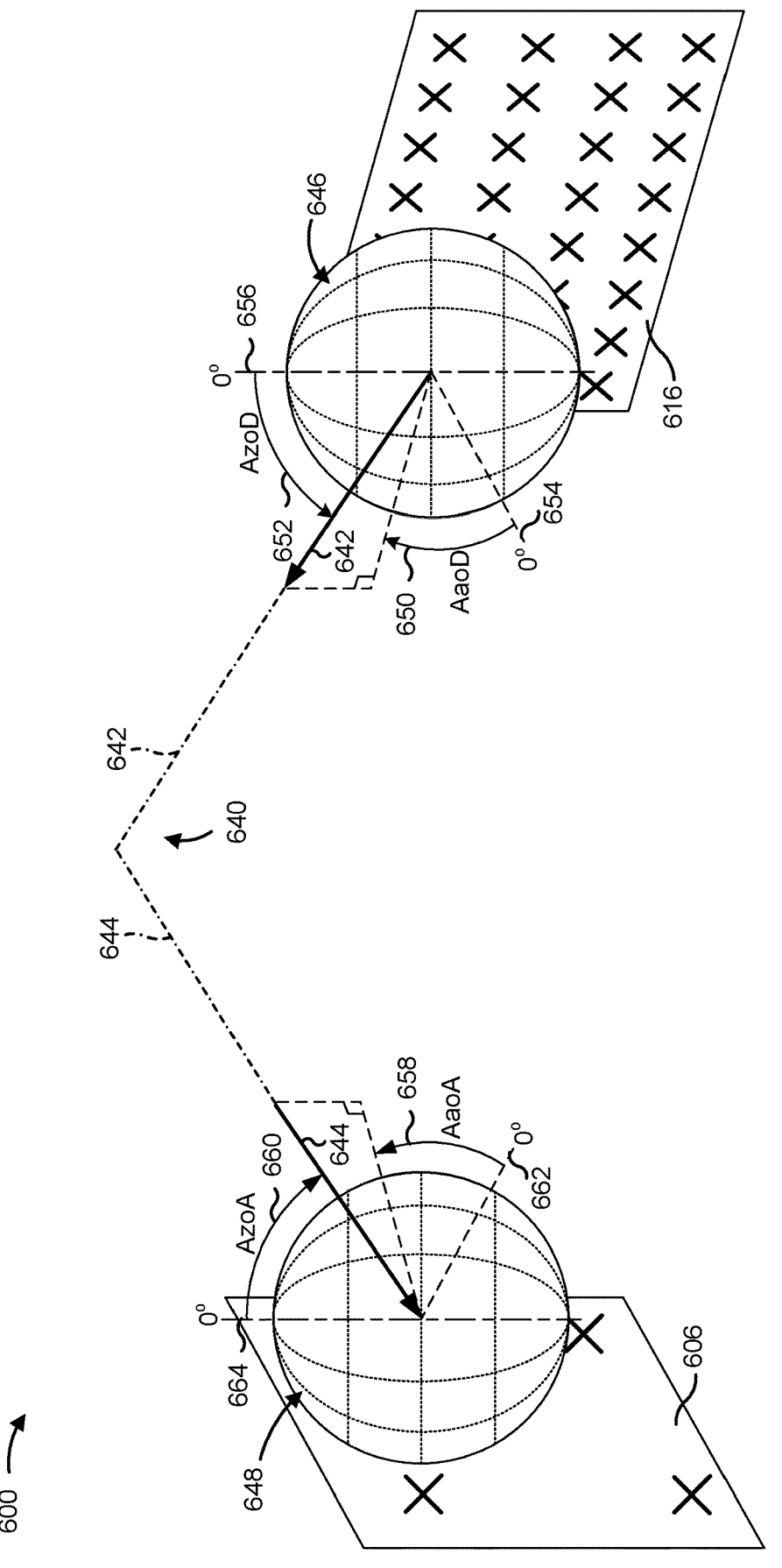
FIG. 6C is a diagram illustrating an example of analog beamforming for millimeter wave communications, showing an angle of departure (AoD) and an angle of arrival (AoA), in accordance with the present disclosure.

As shown in FIG. 6C, for example, the AoD 642 and AoA 644 may be represented in the context of a respective spherical coordinate system 646 or 648. In some examples, the coordinate system 646 and the coordinate system 648 may be the same system. In some other examples, the coordinate system 646 may be different than the coordinate system 648 (e.g., different in orientation and/or scale). As shown, the AoD 642 may include a path (e.g., a direction) determined by a combination of an AaoD 650 and an AzoD 652. The AaoD 650 may be an angle of azimuth defined with respect to an azimuthal axis 654, and the AzoD 652 may be an angle of zenith defined with respect to a zenith axis 656. Similarly, the AoA 644 may include a path (e.g., a direction) determined by a combination of an AaoA 658 and an AzoA 660. The AaoA 658 may be an angle of azimuth defined with respect to an azimuthal axis 662, and the AzoA 660 may be an angle of zenith defined with respect to a zenith axis 664.

To quantize the channel in the angular domain, angles associated with a number of points along the AoA 642 may be mapped to closest grid points. For example, as shown in FIG. 6A, a point 666 associated with the AoA 642 may be mapped to a closest grid point 668 of the four grid points adjacent to the point 666. Repeating this mapping for a plurality of points along the AoA 642 results in a large sparse matrix (e.g., many of the values of the matrix will be zero), represented by $P_R$ and $P_T^*$. The gain will be shown in the $\Delta_d^v$ matrix. A similar mapping procedure may be performed associated with the AoD 644. The dimensionalities of the terms are as follows:

$$P_R: [8\times128^2], \Delta_d^v: [128^2\times128^2], \text{ and } P_T^*: [128^2\times64].$$

The channel may be rewritten in vectorized format, using the Kronecker product:

$$vec(H_d)\approx vec(P_R\Delta_d^v P_T^*)][(P_T^*)^T\otimes P_R]vec(\Delta_d^v),$$

where $\Psi=[(P_T^*)^T\otimes P_R]$ is the sparsifying dictionary and $vec(\Delta_d^v)$ is the sparse representation of the channel. Since the receiver network node 602 knows the sparsifying dictionary and the sparse representation of the channel, the receiver network node 602 may determine an estimate of the channel.

To determine the at least one AoD, the receiver network node 602 may determine an input-output relationship, per-tap, for the $i^{th}$ Rx- and Tx-beamformed measurements, in terms of the output signal, $y_{d_i}$, which has dimensions 2×2:

$$y_{d_i}=A_iH_dB_i=[(B_i)^T\otimes A_i]vec(H_d)=\Phi_i\Psi vec(\Delta_d^v), \quad (6)$$

where $\Phi_i$ is the function of Tx and Rx analog beamforming matrices used for the $i^{th}$ measurement and $\Psi$ is the sparsifying dictionary, as indicated above. As explained above in connection with FIG. 5, the receiver network node 602 may obtain beam measurements (e.g., RSRP measurements) associated with a plurality of beam pairs.

In some aspects, the receiver network node 602 may select beam pairs (e.g., each pair including a Tx beam and an Rx beam) in a manner that facilitates reconstructing H channels (e.g., having a dimension of 8×64) using 2×2 AHB measurements. To select the beam pairs, the receiver network node 602 may rank the obtained RSRP measurements of the beam pairs from highest to lowest. The receiver network node 602 may select the top M beam pairs providing M number of 2×2 AHB measurements. Using the selected M beam pairs, the receiver network node 602 may compute the Kronecker product to obtain the matrix $\Phi$.

In some aspects, for each beam pair, the receiver network node 602 may determine a dth delay tap of the channel impulse response (CIR) for the ith Tx beam and the ith Rx beam $(A_i,B_i)$. Additionally, for example, the receiver network node 602 may determine a second CIR for the dth delay tap associated with a second beam pair $(A_j,B_j)$. Stacking these two CIRs yields $$y_d=\begin{bmatrix} y_{d,i} \\ y_{d,j} \end{bmatrix}.$$

Thus, stacking all M of the CIR measurements yields a standard sparse recovery formulation:

$$y_d=\begin{bmatrix} y_{d_1} \\ y_{d_2} \\ \vdots \\ y_{d_M} \end{bmatrix}=\begin{bmatrix} \Phi_1 \\ \Phi_2 \\ \vdots \\ \Phi_M \end{bmatrix}\Psi vec(\Delta_d^v)=\Phi\Psi vec(\Delta_d^v)=\Phi\Psi x_d,$$

and given $y_d$ and the measurement matrix $\Phi\Psi$, the receiver network node 602 may use a sparse recovery procedure to recover $x_d$ and hence $H_d$. In some aspects, the receiver network node 602 may use any number of different sparse recovery procedure. For example, in some aspects, the receiver network node 602 may use an orthogonal matching pursuit procedure for sparse recovery, hard thresholding, iterative hard thresholding, and/or iterative soft threshold-ing, among other examples.

Millimeter wave channels are sparse in the angular domain. For compressed sensing-based methods (such as OMP), this domain knowledge about millimeter wave chan-nels may be leveraged in designing the sparsifying diction-aries. For example, based at least in part on the sparsity of millimeter wave channels in the angular domain, the angular space at the transmitter and receiver sides may be divided into 2-D grids and the wireless channel may be represented in the angular domain. Accordingly, the complexity of the compressed sensing-based approach may be high due to the resulting high resolution for the 2-D angular grid.

To reduce the complexity associated with compressed sensing-based methods, some aspects may utilize dictionary learning. Using dictionary learning, the receiver network node 602 may directly learn the sparsifying dictionary from training data, rather than relying on a re-defined sparsifying dictionary as is the case in compressed sensing-based meth-ods. In other words, the network node 602 may learn the basis over which the wireless channel is sparse directly from channel data which may give result in a lower dimension-ality for the sparsifying dictionary. A lower dimensionality for the sparsifying dictionary may lead to lower complexity, compared to compressed sensing-based methods, without compromising performance.

As indicated above, FIGS. 6A and 6B are provided as an example. Other examples may differ from what is described with regard to FIGS. 6A and 6B.

Figure 7:
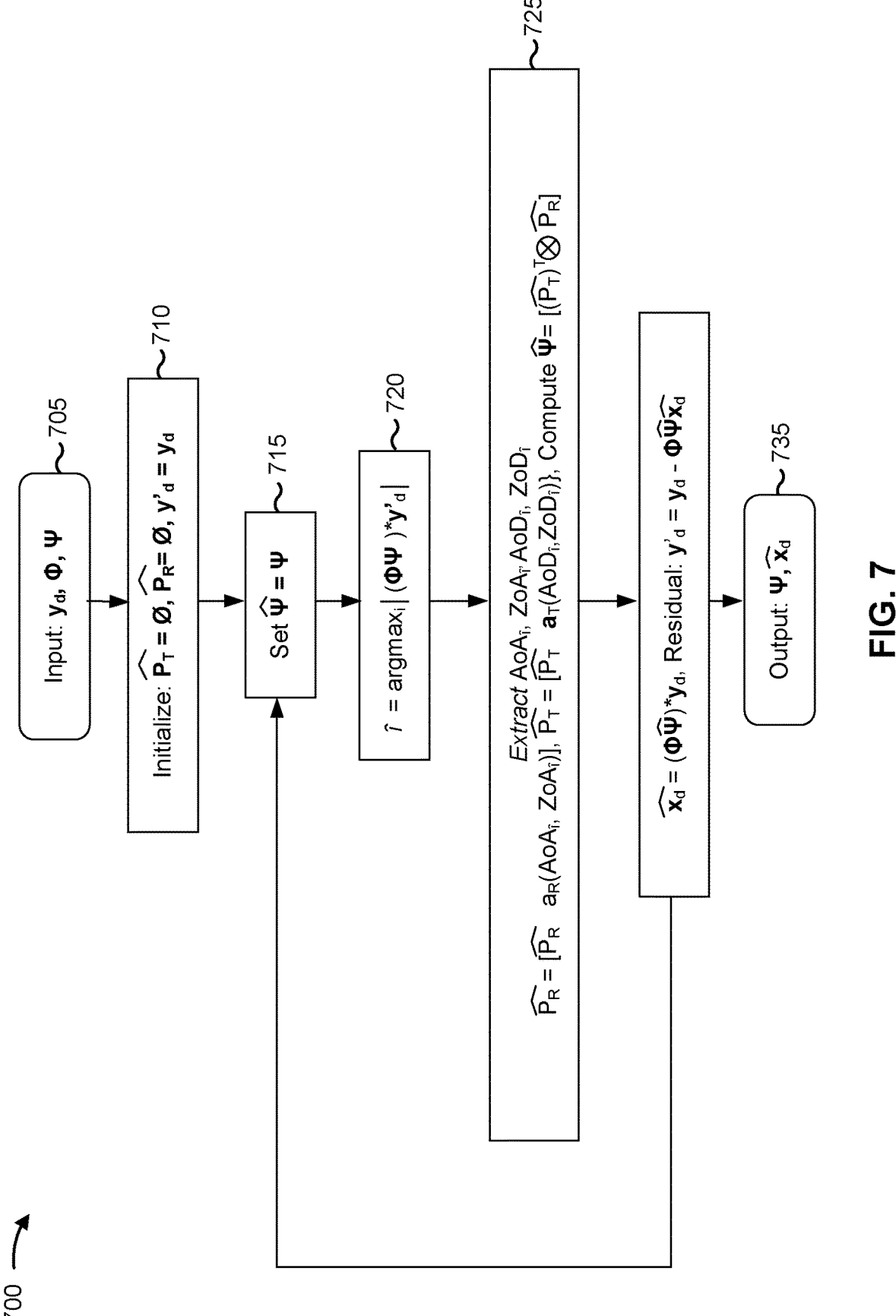
FIG. 7 is a flow chart illustrating an example of an orthogonal matching pursuit (OMP) procedure that may be used to determine a predicted AoD, in accordance with the present disclosure.

FIG. 7 is a flow chart illustrating an example 700 of an orthogonal matching pursuit (OMP) procedure that may be used to determine a predicted AoD, in accordance with the present disclosure. In some aspects, for example, the OMP procedure may be performed by a receiver network node (e.g., the receiver network node 602 depicted in FIGS. 6A and 6B).

In some aspects, the receiver network node may deter-mine, using the procedures described above in connection with FIGS. 6A and 6B, $y_d$ and the measurement matrix $\Phi\Psi$. The OMP procedure illustrated in FIG. 7 may be used to recover $x_d$ and hence $H_d$. The OMP procedure is a successive interference cancelling-based mechanism. In some aspects, the OMP procedure may be performed per-tap. The example 700 illustrates the OMP procedure for tap d. In some aspects, the receiver network node may leverage the sparsity of the mmW channel in the tap domain so that the OMP procedure only needs to be run for a few dominant taps. For each tap, each iteration of the OMP procedure identifies the most likely AoA and AoD. Through the iterative process, the contribution of the identified angles is subtracted from the observation vector, and the residual is computed. In some aspects, the OMP procedure may be iterated up to a point at which a specified criterion is satisfied (e.g., the mean squared error (MSE) of the residual is less than a threshold) or until a specified number of iterations have been completed.

As shown by reference number 705, the receiver network node provides, as input to the OMP procedure that includes $y_d$, $\Phi$, and $\Psi$. As shown by reference number 710, the receiver network node initializes $\widehat{\mathbf{P}_T}=\varnothing$, $\widehat{\mathbf{P}_R}=\varnothing$, and $y'_d=y_d$. As shown by reference number 715, the receiver network node sets $\hat{\Psi}=\Psi$. Then, as shown by reference number 720, the receiver network node performs a correlation step, in which the receiver network node computes the Hermitian of $\Phi\hat{\Psi}$ and multiply it by the observation matrix:

$$\hat{i}=\mathrm{argmax}_i|(\Phi\hat{\Psi})^*y'_d|,$$

where the $i^{th}$ index corresponds to an AoA and AoD quadruple from the sparsifying dictionary. In some aspects, the step indicated by reference number 720 may be conceptualized as a matching step. For example, in this step, the receiver network node correlates the sensing matrix with the observation matrix. Each of the columns of the $\Phi\hat{\Psi}$ matrix provides one of the pairs of AoA and AoD (in both azimuth and elevation). The $\mathrm{argmax}_i$ operator is used to determine the column from the $\Phi\hat{\Psi}$ matrix that has the maximum observation, which enables extraction of the angles AoA and AoD in the next step.

As shown by reference number 725, the receiver network node then extracts, based on the maximum observation determined above, the angles $AoA_{\hat{i}}$, $ZoA_{\hat{i}}$, $AoD_{\hat{i}}$, and $ZoD_{\hat{i}}$ by determining $$\widehat{\mathbf{P}_R}=[\ \widehat{\mathbf{P}_R}\ a_R(AoA_{\hat{i}},ZoA_{\hat{i}})],\ \text{and}$$

$$\widehat{\mathbf{P}_T}=[\ \widehat{\mathbf{P}_T}\ a_T(AoD_{\hat{i}},ZoD_{\hat{i}})],$$

where $a_R$ $(AoA_{\hat{i}},ZoA_{\hat{i}})$ is the transmitter network node antenna element response vector and $a_T$ $(AoD_{\hat{i}},ZoD_{\hat{i}})$ is the receiver network node response vector, and where, for the purpose of this mathematical expression, "AoA" refers to azimuth angle of arrival, "ZoA" refers to zenith angle of arrival, "AoD" refers to azimuth angle of departure, and "ZoD" refers to zenith angle of departure. The step also includes computing:

$$\hat{\Psi}=[(\widehat{\mathbf{P}_T})^T\otimes\widehat{\mathbf{P}_R}].$$

As shown by reference number 730, the receiver network node computes a residual, subtracting out the strongest cluster:

$$y'_d=y_d-\Phi\hat{\Psi}\ \widehat{x_d},$$

where $\widehat{x_d}=(\Phi\hat{\Psi})^*y_d$. As shown, the receiver network node repeats the steps identified by reference numbers 715, 720, 725, and 730. For example, for the second iteration, the receiver network node extracts the angles based on the second strongest cluster and, for the third iteration, the receiver network node extracts the angles based on the third strongest cluster. As shown by reference number 735, the OMP procedure produces the output: $\hat{\Psi}$, $\widehat{x_d}$, which includes a channel estimate. In some aspects, the OMP procedure may be used to determine the strongest cluster only, in which case the procedure may need to be performed only once (one iteration). For example, in indoor hotspot (InH) deployments, where there are often many line-of-sight (LoS) channel clusters, the OMP may be used to identify the LoS, which typically will be the best cluster to use for communication.

In some aspects, the receiver network node may perform, based at least in part on the channel estimate, a mapping from the channel estimate to indices of best beams in an oversampled transmitter network node beamforming codebook and/or an oversampled receiver network node beamforming codebook. In some aspects, for example, the mapping may be performed using a trained neural network. In some aspects, the receiver network node may perform a grid search over beams associated with the oversampled transmitter network node beamforming codebook and/or the oversampled receiver network node beamforming codebook to determine the best beam pairs (e.g., based at least in part on the at least one pair of predicted angles determined using the OMP procedure).

As indicated above, FIG. 7 is provided as an example. Other examples may differ from what is described with regard to FIG. 7.

Figure 8A:
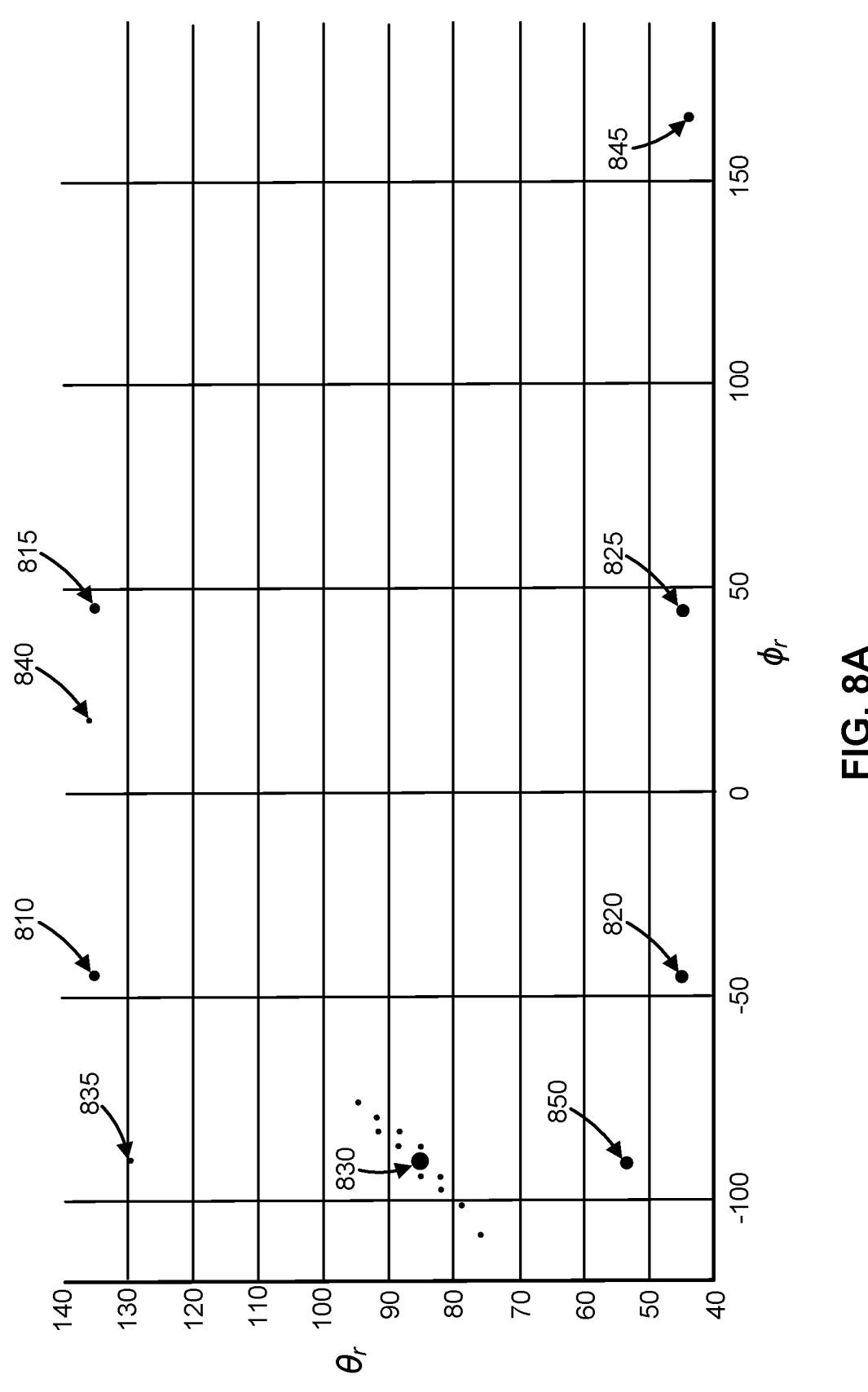
FIG. 8A is a diagram illustrating an example associated with beam selection, in accordance with the present disclosure.
Figure 8B:
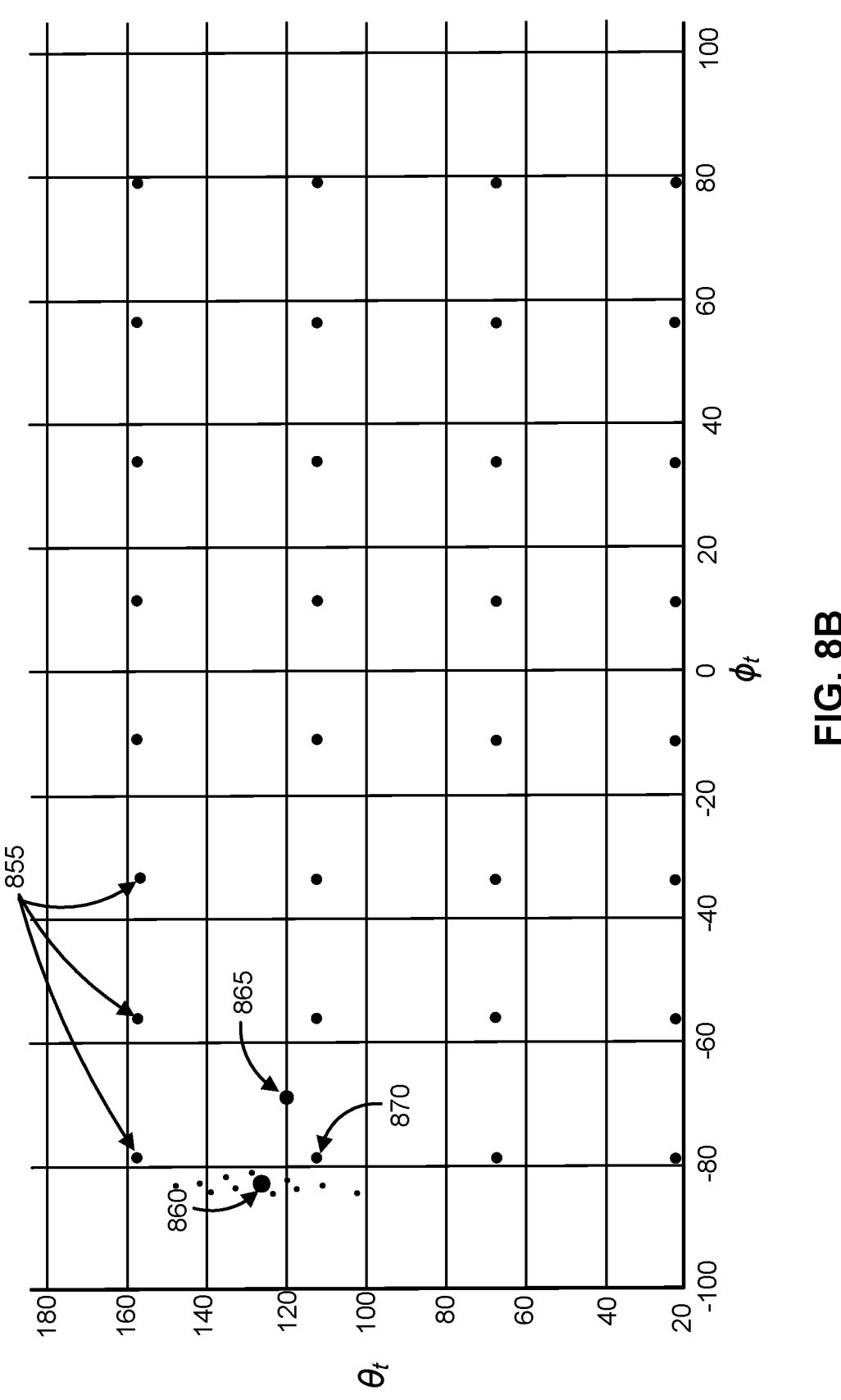
FIG. 8B is a diagram illustrating an example associated with beam selection, in accordance with the present disclosure.

FIGS. 8A and 8B are diagram illustrating examples 800 and 805 associated with beam selection, in accordance with the present disclosure. The example 800 depicts an exemplary graphical representation of a transmitter network node beamforming codebook and the example 805 depicts an exemplary graphical representation of a receiver network node beamforming codebook.

As shown in FIG. 8A, the graphical representation of the receiver network node codebook is depicted using a two-dimensional graph having a horizontal axis that corresponds to azimuth $\phi_r$ and a vertical axis that corresponds to elevation $\theta_r$. As shown, the receiver network node codebook includes beams 810, 815, 820, and 825 (represented as dots indicating directions as defined by the associated angles) arranged according to azimuth and elevation such that, in this example, there are two azimuth values and two elevation values corresponding to the beams 810, 815, 820, and 825, thereby defining a total of four beams 810, 815, 820, and 825. The true channel is indicated by the direction 830 (as shown by a larger dot among a group of small dots). The smaller dots indicate rays associated with the true channel direction 830.

As shown in FIG. 8A, the receiver network node, using one or more of the operations described above in connection with FIGS. 5-6B, may determine predicted AoAs 835, 840, 845, and 850. The AoA 850 also corresponds to the predicted best AoA, which also is a representation of the estimated channel direction that may be determined using the sparse recovery direction. If the receiver network node uses codebook beamforming, the selected beam, from the beamforming codebook, may be the beam 820. However, in some aspects, the receiver network node may determine a beam from an oversampled receiver network node beamforming codebook that is closest to the direction of the AoA 850. As shown, the determined beam is, therefore, much closer in direction to the direction of the true channel direction 830 than is the direction of the codebook beam 820. Additionally, the receiver network node may, as described above, transmit an AoD report to the transmitter network node that informs the transmitter network node of a corresponding predicted AoD, allowing the transmitter network node to also form a custom beam in the direction of the estimated channel. In this way, some aspects of the present disclosure may facilitate selection of, and communication with, beam pairs that provide a higher quality signal.

As shown in FIG. 8B, the graphical representation of the transmitter network node codebook is depicted using a two-dimensional graph having a horizontal axis that corresponds to azimuth $\phi_t$ and a vertical axis that corresponds to elevation $\theta_t$. As shown, the transmitter network node codebook includes beams 855 (represented as dots indicating directions as defined by the associated angles) arranged according to azimuth and elevation such that, in this example, there are eight azimuth values and four elevation values corresponding to the beams 855, thereby defining a total of 32 beams 855. The true channel is indicated by the direction 860.

In some aspects, as indicated above, the receiver network node may indicate a predicted AoD direction 865 to the transmitter network node. The transmitter network node may determine a beam associated with an oversampled network node beamforming codebook that is closest to the predicted AoD direction 865 to facilitate communication with the receiver network node. In some aspects, the transmitter network node may determine that the codebook beam 870 is close to the true channel direction 860. In this case, the transmitter network node may decide to use the codebook beam 870 rather than the oversampled codebook beam. The transmitter network node may indicate to the receiver network node whether the oversampled codebook beam or the codebook beam will be used (or whether another beam will be used).

As indicated above, FIGS. 8A and 8B are provided as examples. Other examples may differ from what is described with regard to FIGS. 8A and 8B.

FIG. 9 is a diagram illustrating an example process 900 performed, for example, by a first network node, in accordance with the present disclosure. Example process 900 is an example where the first network node (e.g., a receiver network node 505) performs operations associated with beam selection using oversampled beamforming codebooks and channel estimates. Process 900 may include additional aspects, such as any single aspect or any combination of aspects described below and/or in connection with one or more other processes described elsewhere herein.

As shown in FIG. 9, in some aspects, process 900 may include receiving, from a second network node, codebook information that indicates a plurality of beams associated with an oversampled transmitter network node beamforming codebook (block 902). For example, the first network node (e.g., using communication manager 1108 and/or reception component 1102, depicted in FIG. 11) may receive, from a second network node, codebook information that indicates a plurality of beams associated with an oversampled transmitter network node beamforming codebook, as described above.

As shown in FIG. 9, in some aspects, process 900 may include receiving, from a second network node, a plurality of signals (block 904). For example, the first network node (e.g., using communication manager 1108 and/or reception component 1102, depicted in FIG. 11) may receive, from a second network node, a plurality of signals, as described above. In some aspects, process 900 includes receiving, using at least one reception beam, a plurality of signals associated with a plurality of transmission beams, and obtaining a plurality of beam measurements associated with the plurality of transmission beams based at least in part on the at least one reception beam.

As shown in FIG. 9, in some aspects, process 900 may include obtaining beam measurements based at least in part on the plurality of signals (block 906). For example, the first network node (e.g., using communication manager 1108 and/or determination component 1110, depicted in FIG. 11) may obtain beam measurements based at least in part on the plurality of signals, as described above. In some aspects, the one or more beam measurements are associated with at least one beam pair, of a set of beam pairs, corresponding to a subset of RSRP measurements having largest RSRP values of a set of RSRP values associated with a plurality of beam pairs, wherein each beam pair of the plurality of beam pairs comprises a transmission beam of the plurality of transmission beams and a reception beam of the at least one reception beam.

As shown in FIG. 9, in some aspects, process 900 may include determining at least one pair of predicted angles (block 908). For example, the first network node (e.g., using communication manager 1108 and/or determination component 1110, depicted in FIG. 11) may determine at least one pair of predicted angles, as described above. In some aspects, process 900 includes determining at least one pair of predicted angles associated with a dominant channel cluster based at least in part on performing the sparse recovery operation using one or more beam measurements of the plurality of beam measurements as inputs to the sparse recovery operation, wherein the at least one pair of predicted angles comprises a predicted AoD and a corresponding predicted AoA.

As shown in FIG. 9, in some aspects, process 900 may include obtaining a channel estimate (block 910). For example, the first network node (e.g., using communication manager 1108 and/or determination component 1110, depicted in FIG. 11) may obtain a channel estimate, as described above. In some aspects, process 900 includes obtaining the channel estimate based at least in part on a sparse recovery operation. In some aspects, the sparse recovery operation is based at least in part on an OMP procedure. In some aspects, process 900 includes determining the channel estimate based at least in part on using one or more beam measurements of the plurality of beam measurements as inputs to the sparse recovery operation.

As shown in FIG. 9, in some aspects, process 900 may include determining at least one oversampled reception beam (block 912). For example, the first network node (e.g., using communication manager 1108 and/or determination component 1110, depicted in FIG. 11) may determine at least one reception beam associated with an oversampled receiver network node beamforming codebook based at least in part on the channel estimate, as described above.

As shown in FIG. 9, in some aspects, process 900 may include transmitting a beam selection report (block 914). For example, the first network node (e.g., using communication manager 1108 and/or transmission component 1104, depicted in FIG. 11) may transmit a beam selection report, as described above. In some aspects, process 900 includes transmitting a beam selection report that indicates at least one suggested transmission beam associated with the oversampled transmitter network node beamforming codebook. In some aspects, the at least one suggested transmission beam is based at least in part on the channel estimate. In some aspects, the at least one suggested transmission beam is based at least in part on a mapping between the channel estimate and the oversampled transmitter network node beamforming codebook, and wherein the mapping is based at least in part on a trained neural network. In some aspects, the at least one suggested transmission beam is based at least in part on performing a grid search operation associated with the oversampled transmitter network node beamforming codebook and based at least in part on the channel estimate.

As shown in FIG. 9, in some aspects, process 900 may include receiving a beam suggestion response indication (block 916). For example, the first network node (e.g., using communication manager 1108 and/or reception component 1102, depicted in FIG. 11) may receive a beam suggestion response indication, as described above. In some aspects, process 900 includes receiving a beam suggestion response indication that indicates whether the second network node will use the at least one suggested transmission beam.

As shown in FIG. 9, in some aspects, process 900 may include determining at least one reception beam to use (block 918). For example, the first network node (e.g., using communication manager 1108 and/or determination component 1110, depicted in FIG. 11) may determine at least one reception beam to use, as described above. In some aspects, process 900 includes determining to use the at least one reception beam based at least in part on the beam suggestion response indication.

As shown in FIG. 9, in some aspects, process 900 may include communicating using the at least one reception beam (block 920). For example, the first network node (e.g., using communication manager 1108, reception component 1102, and/or transmission component 1104, depicted in FIG. 11) may communicate using the at least one reception beam, as described above.

For example, in some aspects, the first network node may communicating with the second network node based at least in part on a channel estimate that is obtained without obtaining beam measurements associated with beams that are associated with the oversampled transmitter network node beamforming codebook. In some aspects, the at least one reception beam comprises a reception beam associated with the oversampled receiver network node beamforming codebook.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
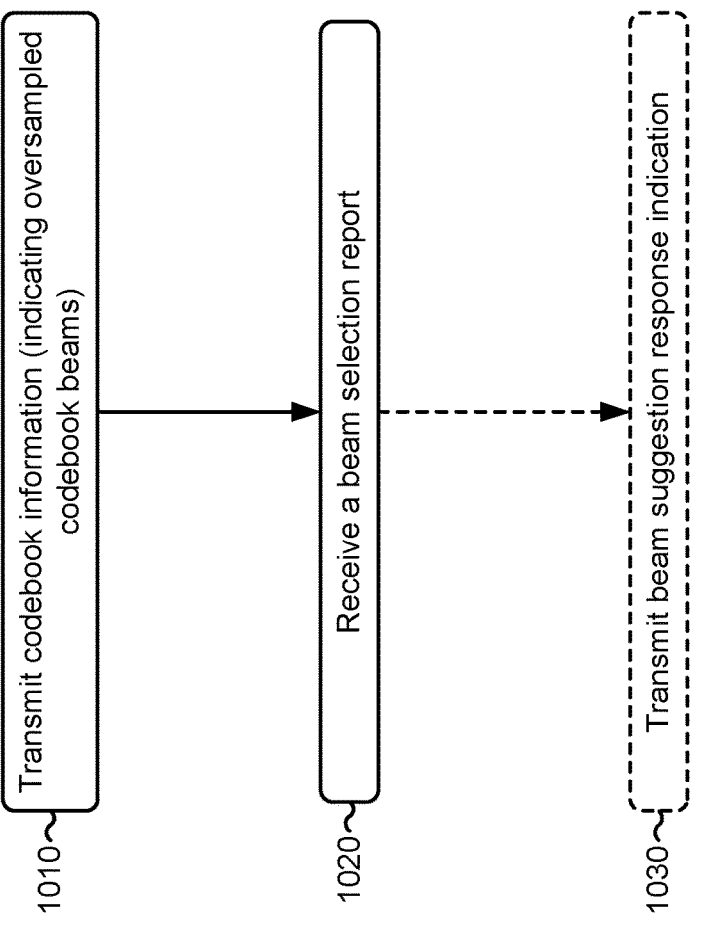
FIG. 10 is a diagram illustrating an example process associated with beam selection using oversampled beamforming codebooks and channel estimates, in accordance with the present disclosure.

FIG. 10 is a diagram illustrating an example process 1000 performed, for example, by a first network node, in accordance with the present disclosure. Example process 1000 is an example where the first network node (e.g., the transmitter network node 510) performs operations associated with beam selection using oversampled beamforming codebooks and channel estimates. Process 1000 may include additional aspects, such as any single aspect or any combination of aspects described below and/or in connection with one or more other processes described elsewhere herein.

As shown in FIG. 10, in some aspects, process 1000 may include transmitting, to a second network node, codebook information that indicates a plurality of beams associated with an oversampled transmitter network node beamforming codebook (block 1010). For example, the first network node (e.g., using communication manager 1108 and/or transmission component 1104, depicted in FIG. 11) may transmit, to a second network node, codebook information that indicates a plurality of beams associated with an oversampled transmitter network node beamforming codebook, as described above.

As further shown in FIG. 10, in some aspects, process 1000 may include receiving a beam selection report that indicates at least one suggested transmission beam associated with the oversampled transmitter network node beamforming codebook (block 1020). For example, the first network node (e.g., using communication manager 1108 and/or reception component 1102, depicted in FIG. 11) may receive a beam selection report that indicates at least one suggested transmission beam associated with the oversampled transmitter network node beamforming codebook, as described above.

In a first aspect, the at least one suggested transmission beam is based at least in part on a channel estimate, wherein the channel estimate is based at least in part on a sparse recovery operation. In a second aspect, the sparse recovery operation is based at least in part on an OMP procedure. In a third aspect, the sparse recovery operation is not based on beam measurements associated with beams that are associated with the oversampled transmitter network node beamforming codebook. In a fourth aspect, the at least one suggested transmission beam is based at least in part on a mapping between the channel estimate and the oversampled transmitter network node beamforming codebook, and wherein the mapping is based at least in part on a trained neural network. In a fifth aspect, the at least one suggested transmission beam is based at least in part on a grid search operation associated with the oversampled transmitter network node beamforming codebook and based at least in part on the channel estimate.

As further shown in FIG. 10, in some aspects, process 1000 may include transmitting a beam suggestion response indication that indicates whether the first network node will use the at least one suggested transmission beam (block 1030). For example, the first network node (e.g., using communication manager 1108 and/or transmission component 1104, depicted in FIG. 11) may transmit a beam suggestion response indication that indicates whether the first network node will use the at least one suggested transmission beam, as described above.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
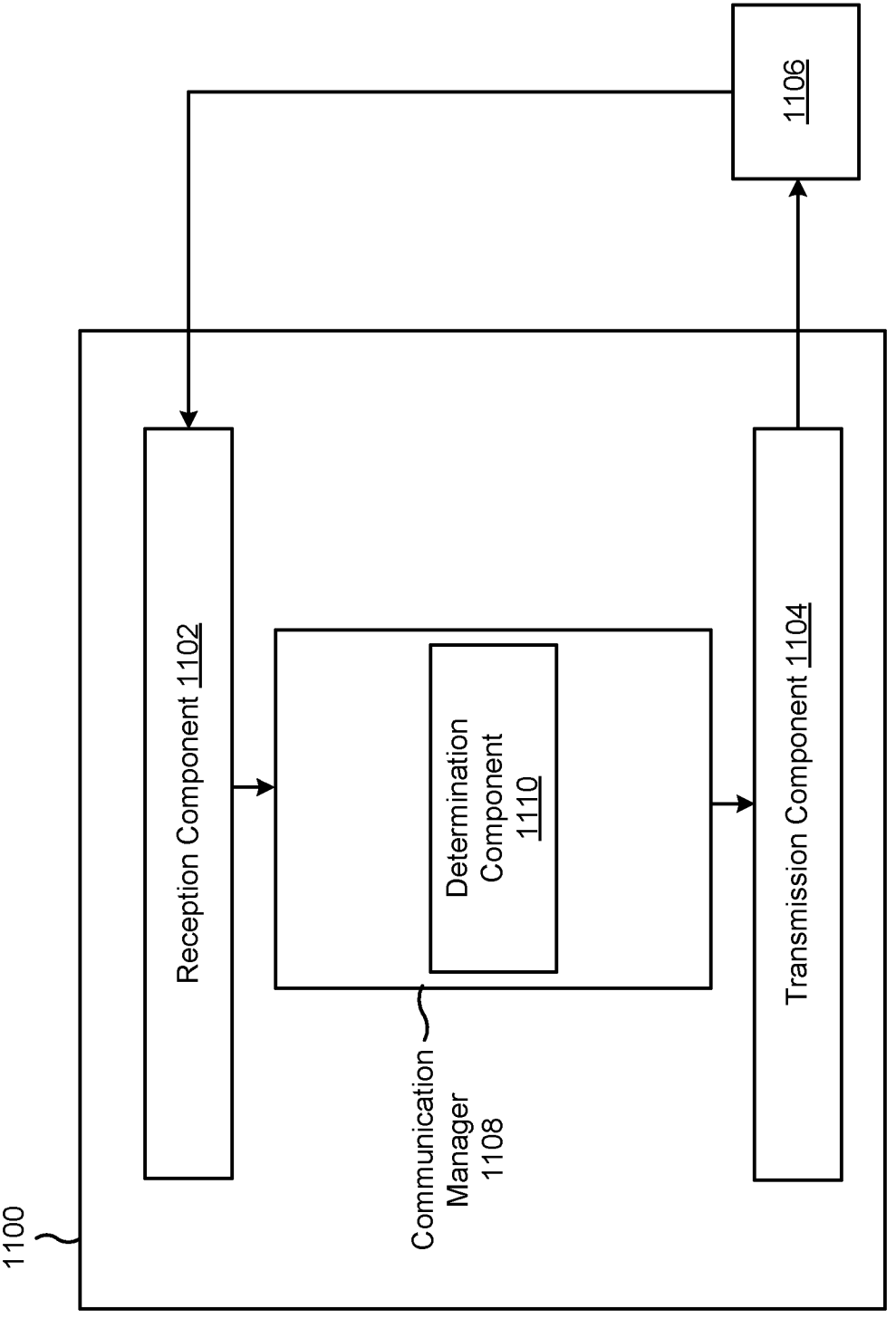
FIG. 11 is a diagram of an example apparatus for wireless communication, in accordance with the present disclosure.

FIG. 11 is a diagram of an example apparatus 1100 for wireless communication. The apparatus 1100 may be, or include, a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may include a determination component 1110.

In some aspects, the apparatus 1100 may be configured to perform one or more operations described herein in connection with FIGS. 5, 6A, 6B, 7, 8A, and 8B. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE or base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE or base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE or base station described in connection with FIG. 2. In some aspects, the transmission component 1104 may be co-located with the reception component 1102 in a transceiver.

The reception component 1102 may receive, from a second network node, codebook information that indicates a plurality of beams associated with an oversampled transmitter network node beamforming codebook. The communication manager 1108, the reception component 1102, and/or the transmission component 1104 may transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

In some aspects, the communication manager 1108 may include one or more antennas, a modem, a controller/processor, a memory, or a combination thereof, of the UE or the base station described in connection with FIG. 2. In some aspects, the communication manager 1108 may be, be similar to, include, or be included in, the communication manager 140 or the communication manager 150, depicted in FIGS. 1 and 2. In some aspects, the communication manager 1108 may include the reception component 1102 and/or the transmission component 1104.

The communication manager 1108 may obtain the channel estimate based at least in part on a sparse recovery operation. The reception component 1102 may receive, using at least one reception beam, a plurality of signals associated with a plurality of transmission beams. The communication manager 1108 and/or the reception component 1102 may obtain a plurality of beam measurements associated with the plurality of transmission beams based at least in part on the at least one reception beam.

The determination component 1110 may determine at least one pair of predicted angles associated with a dominant channel cluster based at least in part on performing the sparse recovery operation using one or more beam measurements of the plurality of beam measurements as inputs to the sparse recovery operation, wherein the at least one pair of predicted angles comprises a predicted AoD and a corresponding predicted AoA. In some aspects, the determination component 1110 may include one or more antennas, a modem, a controller/processor, a memory, or a combination thereof, of the UE or the base station described in connection with FIG. 2. In some aspects, the determination component 1110 may include the reception component 1102 and/or the transmission component 1104.

The determination component 1110 may determine the channel estimate based at least in part on using one or more beam measurements of the plurality of beam measurements as inputs to the sparse recovery operation. The determination component 1110 may determine the reception beam associated with the oversampled receiver network node beamforming codebook based at least in part on the channel estimate.

The transmission component 1104 may transmit a beam selection report that indicates at least one suggested transmission beam associated with the oversampled transmitter network node beamforming codebook. The reception component 1102 may receive a beam suggestion response indication that indicates whether the second network node will use the at least one suggested transmission beam. The determination component 1110 may determine to use the at least one reception beam based at least in part on the beam suggestion response indication. The communication manager 1108, the reception component 1102, and/or the transmission component 1104 may communicate with the second network node using at least one reception beam, wherein the at least one reception beam comprises a reception beam associated with the oversampled receiver network node beamforming codebook.

The transmission component 1104 may transmit, to a second network node, codebook information that indicates a plurality of beams associated with an oversampled transmitter network node beamforming codebook. The reception component 1102 may receive a beam selection report that indicates at least one suggested transmission beam associated with the oversampled transmitter network node beamforming codebook. The transmission component 1104 may transmit a beam suggestion response indication that indicates whether the first network node will use the at least one suggested transmission beam.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
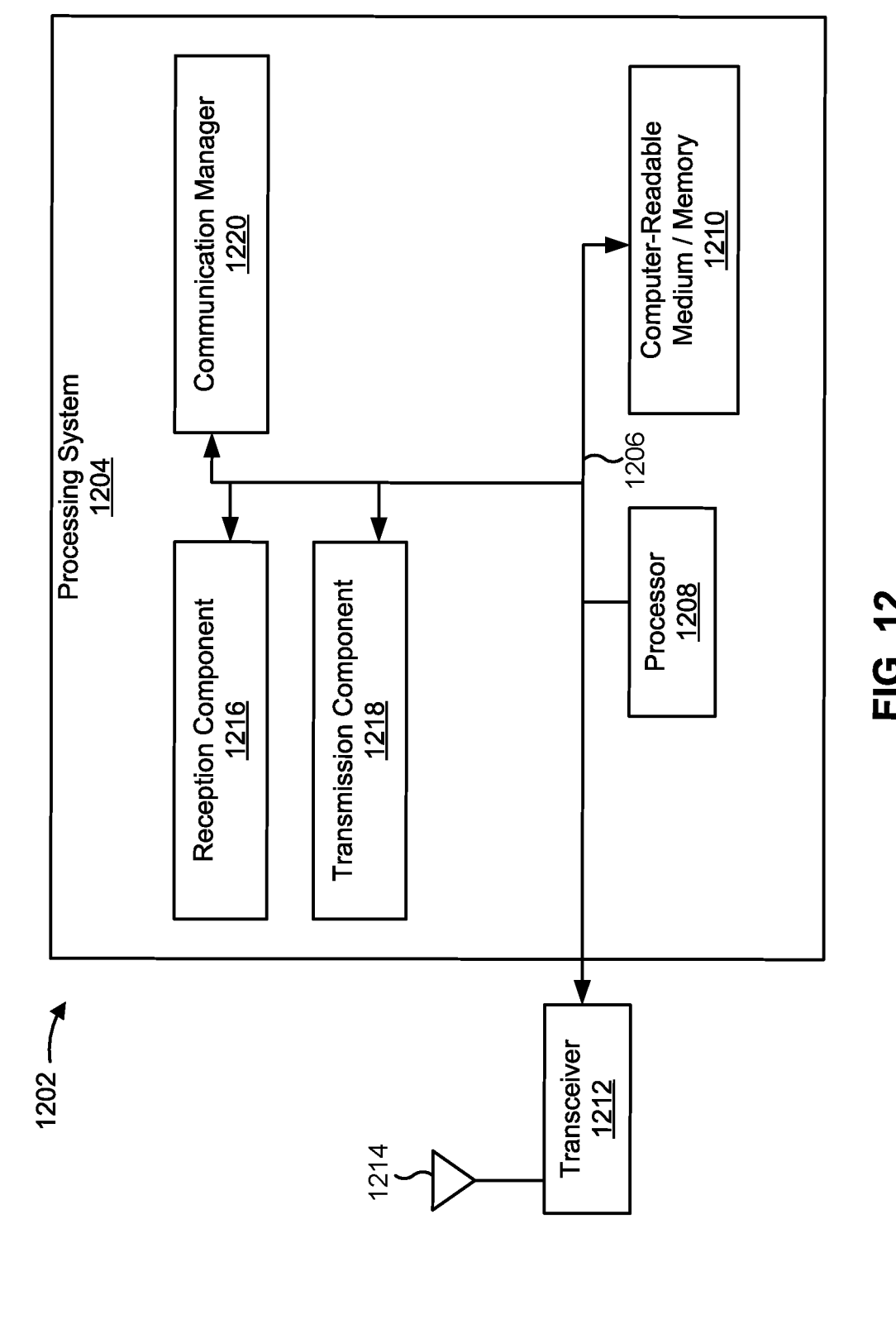
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1202 employing a processing system 1204. The apparatus 1202 may be, be similar to, include, or be included in the apparatus 1100 shown in FIG. 11. For example, the apparatus 1202 may be, include, or be included in, a network node.

The processing system 1204 may be implemented with a bus architecture, represented generally by the bus 1206. The bus 1206 may include any number of interconnecting buses and bridges depending on the specific application of the processing system 1204 and the overall design constraints. The bus 1206 links together various circuits including one or more processors and/or hardware components, represented by a processor 1208, the illustrated components, and the computer-readable medium/memory 1210. The bus 1206 may also link various other circuits, such as timing sources, peripherals, voltage regulators, power management circuits, and/or the like.

The processing system 1204 may be coupled to and/or associated with a transceiver 1212. The transceiver 1212 is coupled to one or more antennas 1214. The transceiver 1212 provides a means for communicating with various other apparatuses over a transmission medium. The transceiver 1212 receives a signal from the one or more antennas 1214, extracts information from the received signal, and provides the extracted information to the processing system 1204, specifically a reception component 1216. The reception component 1216 may be, be similar to, include, or be included in, the reception component 1102, depicted in FIG. 11. In addition, the transceiver 1212 receives information from the processing system 1204, specifically a transmission component 1218, and generates a signal to be applied to the one or more antennas 1214 based at least in part on the received information. The transmission component 1218 may be, be similar to, include, or be included in, the transmission component 1104, depicted in FIG. 11.

The processor 1208 is coupled to the computer-readable medium/memory 1210. The processor 1208 is responsible for general processing, including the execution of software stored on the computer-readable medium/memory 1210. The software, when executed by the processor 1208, causes the processing system 1204 to perform the various functions described herein in connection with a receiving device. The computer-readable medium/memory 1210 may also be used for storing data that is manipulated by the processor 1208 when executing software. The processing system also may include a communication manager 1220. The communication manager 1220 may organize, prioritize, activate, facilitate and/or otherwise manage communication operations performed by the apparatus 1202. The processing system 1204 may include any number of additional components not illustrated in FIG. 12. The components illustrated and/or not illustrated may be software modules running in the processor 1208, resident/stored in the computer-readable medium/memory 1210, one or more hardware modules coupled to the processor 1208, or some combination thereof.

In some aspects, the processing system 1204 may be a component of the base station 110 and may include the memory 242 and/or at least one of the TX MIMO processor 230, the receive processor 238, and/or the controller/processor 240. In some aspects, the processing system 1204 may be a component of the UE 120 and may include the memory 282 and/or at least one of the TX MIMO processor 266, the receive processor 258, and/or the controller/processor 280. In some aspects, the apparatus 1202 for wireless communication provides means for receiving, from a network node, codebook information that indicates a plurality of beams associated with an oversampled transmitter network node beamforming codebook; and transmitting a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

In some aspects, the apparatus 1202 for wireless communication provides means for obtaining the channel estimate based at least in part on a sparse recovery operation. In some aspects, the apparatus 1202 for wireless communication provides means for receiving, using at least one reception beam, a plurality of signals associated with a plurality of transmission beams. In some aspects, the apparatus 1202 for wireless communication provides means for obtaining a plurality of beam measurements associated with the plurality of transmission beams based at least in part on the at least one reception beam.

In some aspects, the apparatus 1202 for wireless communication provides means for determining at least one pair of predicted angles associated with a dominant channel cluster based at least in part on performing the sparse recovery operation using one or more beam measurements of the plurality of beam measurements as inputs to the sparse recovery operation, wherein the at least one pair of predicted angles comprises a predicted AoD and a corresponding predicted AoA. In some aspects, the apparatus 1202 for wireless communication provides means for determining the channel estimate based at least in part on using one or more beam measurements of the plurality of beam measurements as inputs to the sparse recovery operation. In some aspects, the apparatus 1202 for wireless communication provides means for determining the reception beam associated with the oversampled receiver network node beamforming codebook based at least in part on the channel estimate.

In some aspects, the apparatus 1202 for wireless communication provides means for communicating with the second network node using at least one reception beam, wherein the at least one reception beam comprises a reception beam associated with the oversampled receiver network node beamforming codebook. In some aspects, the apparatus 1202 for wireless communication provides means for receiving a beam suggestion response indication that indicates whether the second network node will use the at least one suggested transmission beam. In some aspects, the apparatus 1202 for wireless communication provides means for determining to use the at least one reception beam based at least in part on the beam suggestion response indication.

In some aspects, the apparatus 1202 for wireless communication provides means for transmitting, to a second network node, codebook information that indicates a plurality of beams associated with an oversampled transmitter network node beamforming codebook. In some aspects, the apparatus 1202 for wireless communication provides means for receiving a beam selection report that indicates at least one suggested transmission beam associated with the oversampled transmitter network node beamforming codebook. In some aspects, the apparatus 1202 for wireless communication provides means for transmitting a beam suggestion response indication that indicates whether the first network node will use the at least one suggested transmission beam.

The aforementioned means may be one or more of the aforementioned components of the processing system 1204 of the apparatus 1202 configured to perform the functions recited by the aforementioned means. As described elsewhere herein, the processing system 1204 may include the TX MIMO processor 230 or 266, the receive processor 238 or 258, the controller/processor 240 or 280, and/or the memory 242 or 282. In one configuration, the aforementioned means may be the TX MIMO processor 230 or 266, the receive processor 238 or 258, the controller/processor 240 or 280, and/or the memory 242 or 282 configured to perform the functions and/or operations recited herein.

FIG. 12 is provided as an example. Other examples may differ from what is described in connection with FIG. 12.

Figure 13:
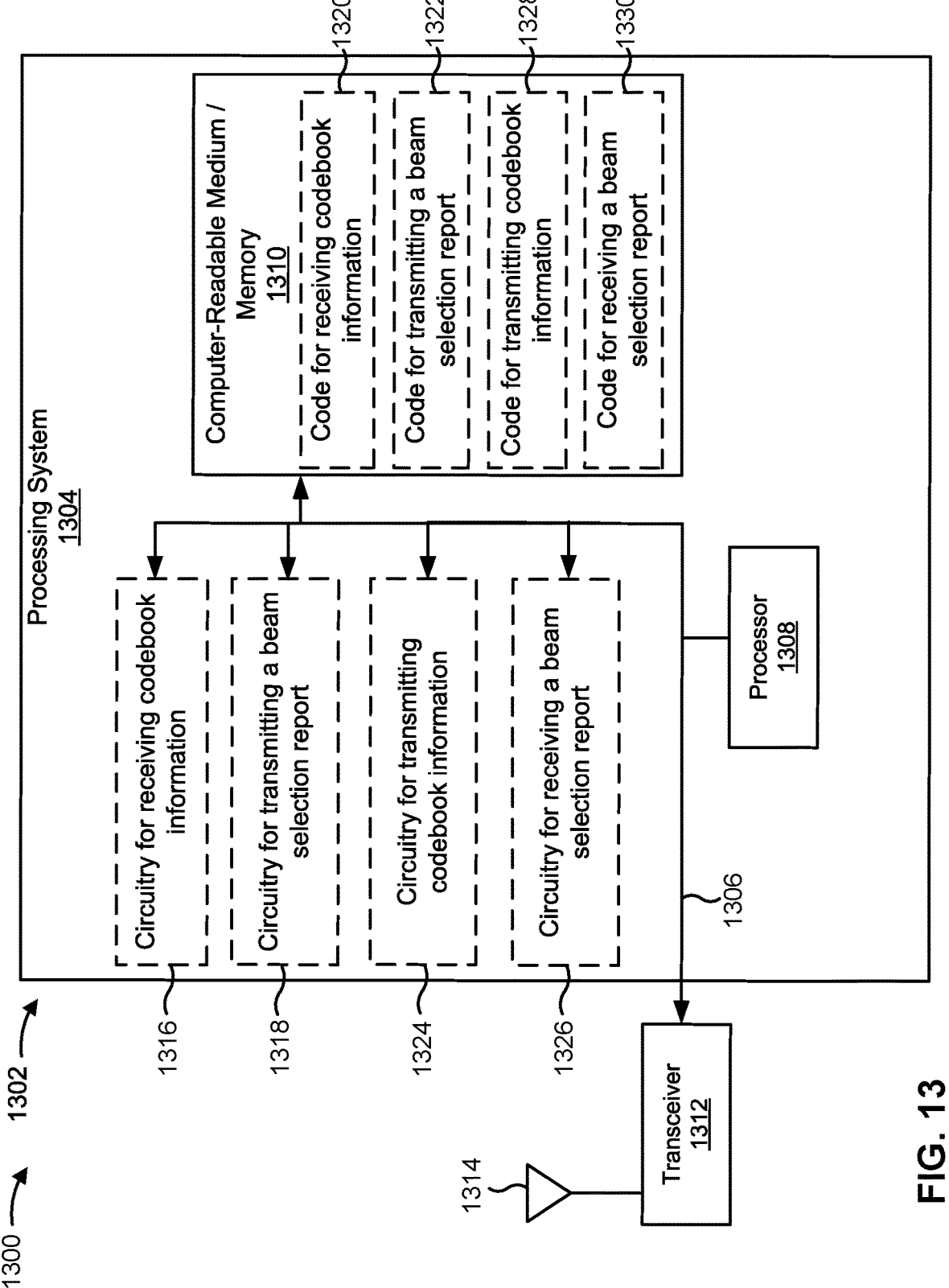
FIG. 13 is a diagram illustrating an example implementation of code and circuitry for an apparatus, in accordance with the present disclosure.

FIG. 13 is a diagram illustrating an example 1300 of an implementation of code and circuitry for an apparatus 1302 for wireless communication. The apparatus 1302 may be, be similar to, include, or be included in the apparatus 1100 shown in FIG. 11, and/or the apparatus 1202 shown in FIG. 12. For example, the apparatus 1302 may be, include, or be included in, a network node (e.g., UE or a base station). The apparatus 1302 may include a processing system 1304, which may include a bus 1306 coupling one or more components such as, for example, a processor 1308, computer-readable medium/memory 1310, a transceiver 1312, and/or the like. As shown, the transceiver 1312 may be coupled to one or more antennas 1314.

As further shown in FIG. 13, the apparatus 1302 may include circuitry for receiving codebook information (circuitry 1316). For example, the apparatus 1302 may include circuitry 1316 to enable the apparatus 1302 to receive codebook information that indicates a plurality of beams associated with an oversampled transmitter network node beamforming codebook.

As further shown in FIG. 13, the apparatus 1302 may include circuitry for transmitting a beam selection report (circuitry 1318). For example, the apparatus 1302 may include circuitry 1318 to enable the apparatus 1302 to transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

As further shown in FIG. 13, the apparatus 1302 may include, stored in computer-readable medium 1310, code for receiving codebook information (code 1320). For example, the apparatus 1302 may include code 1320 that, when executed by the processor 1308, may cause the transceiver 1312 to receive codebook information that indicates a plurality of beams associated with an oversampled transmitter network node beamforming codebook.

As further shown in FIG. 13, the apparatus 1302 may include, stored in computer-readable medium 1310, code for transmitting a beam selection report (code 1322). For example, the apparatus 1302 may include code 1322 that, when executed by the processor 1308, may cause the transceiver 1312 to transmit a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

As further shown in FIG. 13, the apparatus 1302 may include circuitry for transmitting codebook information (circuitry 1324). For example, the apparatus 1302 may include circuitry 1324 to enable the apparatus 1302 to transmit codebook information that indicates a plurality of beams associated with an oversampled transmitter network node beamforming codebook.

As further shown in FIG. 13, the apparatus 1302 may include circuitry for receiving a beam selection report (circuitry 1326). For example, the apparatus 1302 may include circuitry 1326 to enable the apparatus 1302 to receive a beam selection report that indicates at least one suggested transmission beam associated with the oversampled transmitter network node beamforming codebook.

As further shown in FIG. 13, the apparatus 1302 may include, stored in computer-readable medium 1310, code for transmitting codebook information (code 1328). For example, the apparatus 1302 may include code 1328 that, when executed by the processor 1308, may cause the transceiver 1312 to transmit codebook information that indicates a plurality of beams associated with an oversampled transmitter network node beamforming codebook.

As further shown in FIG. 13, the apparatus 1302 may include, stored in computer-readable medium 1310, code for receiving a beam selection report (code 1330). For example, the apparatus 1302 may include code 1330 that, when executed by the processor 1308, may cause the transceiver 1312 to receive a beam selection report that indicates at least one suggested transmission beam associated with the oversampled transmitter network node beamforming codebook.

FIG. 13 is provided as an example. Other examples may differ from what is described in connection with FIG. 13.

The following provides an overview of some Aspects of the present disclosure:

Aspect 1: A method of wireless communication performed by a first network node, comprising: receiving, from a second network node, codebook information that indicates a plurality of beams associated with an oversampled transmitter network node beamforming codebook and; transmitting a beam selection report that indicates at least one suggested transmission beam associated with the oversampled transmitter network node beamforming codebook, wherein the beam selection report is based at least in part on a channel estimate that is obtained without obtaining beam measurements associated with beams that are associated with the oversampled transmitter network node beamforming codebook.

Aspect 2: The method of Aspect 1, further comprising obtaining the channel estimate based at least in part on a sparse recovery operation.

Aspect 3: The method of Aspect 2, wherein the sparse recovery operation is based at least in part on an OMP procedure.

Aspect 4: The method of either of Aspects 2 or 3, further comprising: receiving, using at least one reception beam, a plurality of signals associated with a plurality of transmission beams; and obtaining a plurality of beam measurements associated with the plurality of transmission beams based at least in part on the at least one reception beam.

Aspect 5: The method of Aspect 4, further comprising: determining at least one pair of predicted angles associated with a dominant channel cluster based at least in part on performing the sparse recovery operation using one or more beam measurements of the plurality of beam measurements as inputs to the sparse recovery operation, wherein the at least one pair of predicted angles comprises a predicted angle of departure (AoD) and a corresponding predicted angle of arrival (AoA).

Aspect 6: The method of either of Aspects 4 or 5, further comprising: determining the channel estimate based at least in part on using one or more beam measurements of the plurality of beam measurements as inputs to the sparse recovery operation; and determining the reception beam associated with an oversampled receiver network node beamforming codebook based at least in part on the channel estimate.

Aspect 7: The method of Aspect 6, wherein the one or more beam measurements are associated with at least one beam pair, of a set of beam pairs, corresponding to a subset of reference signal received power (RSRP) measurements having largest RSRP values of a set of RSRP values associated with a plurality of beam pairs, wherein each beam pair of the plurality of beam pairs comprises a transmission beam of the plurality of transmission beams and a reception beam of the at least one reception beam.

Aspect 8: The method of any of Aspects 1-7, further comprising communicating with the second network node using at least one reception beam, wherein the at least one reception beam comprises a reception beam associated with the oversampled receiver network node beamforming codebook.

Aspect 9: The method of Aspect 1, wherein the at least one suggested transmission beam is based at least in part on the channel estimate.

Aspect 10: The method of Aspect 9, wherein the at least one suggested transmission beam is based at least in part on a mapping between the channel estimate and the oversampled transmitter network node beamforming codebook, and wherein the mapping is based at least in part on a trained neural network.

Aspect 11: The method of any of Aspects 1-10, wherein the at least one suggested transmission beam is based at least in part on performing a grid search operation associated with the oversampled transmitter network node beamforming codebook and based at least in part on the channel estimate.

Aspect 12: The method of any of Aspects 1-11, further comprising receiving a beam suggestion response indication that indicates whether the second network node will use the at least one suggested transmission beam.

Aspect 13: The method of Aspect 12, further comprising determining to use the at least one reception beam based at least in part on the beam suggestion response indication.

Aspect 14: A method of wireless communication performed by a first network node, comprising: transmitting, to a second network node, codebook information that indicates a plurality of beams associated with an oversampled transmitter network node beamforming codebook; and receiving a beam selection report that indicates at least one suggested transmission beam associated with the oversampled transmitter network node beamforming codebook.

Aspect 15: The method of Aspect 14, wherein the at least one suggested transmission beam is based at least in part on a channel estimate, wherein the channel estimate is based at least in part on a sparse recovery operation.

Aspect 16: The method of Aspect 15, wherein the sparse recovery operation is based at least in part on an OMP procedure.

Aspect 17: The method of either of Aspects 15 or 16, wherein the sparse recovery operation is not based on beam measurements associated with beams that are associated with an oversampled receiver network node beamforming codebook.

Aspect 18: The method of any of Aspects 15-17, wherein the at least one suggested transmission beam is based at least in part on a mapping between the channel estimate and the oversampled transmitter network node beamforming codebook, and wherein the mapping is based at least in part on a trained neural network.

Aspect 19: The method of any of Aspects 15-18, wherein the at least one suggested transmission beam is based at least in part on a grid search operation associated with the oversampled transmitter network node beamforming codebook and based at least in part on the channel estimate.

Aspect 20: The method of any of Aspects 14-19, further comprising transmitting a beam suggestion response indication that indicates whether the first network node will use the at least one suggested transmission beam.

Aspect 21: An apparatus for wireless communication at a device, comprising a processor; memory coupled with the processor; and instructions stored in the memory and executable by the processor to cause the apparatus to perform the method of one or more of Aspects 1-13.

Aspect 22: A device for wireless communication, comprising a memory and one or more processors coupled to the memory, the one or more processors configured to perform the method of one or more of Aspects 1-13.

Aspect 23: An apparatus for wireless communication, comprising at least one means for performing the method of one or more of Aspects 1-13.

Aspect 24: A non-transitory computer-readable medium storing code for wireless communication, the code comprising instructions executable by a processor to perform the method of one or more of Aspects 1-13.

Aspect 25: A non-transitory computer-readable medium storing a set of instructions for wireless communication, the set of instructions comprising one or more instructions that, when executed by one or more processors of a device, cause the device to perform the method of one or more of Aspects 1-13.

Aspect 26: An apparatus for wireless communication at a device, comprising a processor; memory coupled with the processor; and instructions stored in the memory and executable by the processor to cause the apparatus to perform the method of one or more of Aspects 14-20.

Aspect 27: A device for wireless communication, comprising a memory and one or more processors coupled to the memory, the one or more processors configured to perform the method of one or more of Aspects 14-20.

Aspect 28: An apparatus for wireless communication, comprising at least one means for performing the method of one or more of Aspects 14-20.

Aspect 29: A non-transitory computer-readable medium storing code for wireless communication, the code comprising instructions executable by a processor to perform the method of one or more of Aspects 14-20.

Aspect 30: A non-transitory computer-readable medium storing a set of instructions for wireless communication, the set of instructions comprising one or more instructions that, when executed by one or more processors of a device, cause the device to perform the method of one or more of Aspects 14-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node for wireless communication, comprising:
    one or more memories; and
    one or more processors, coupled to the one or more memories, configured to:
        receive, from a second network node, information that indicates a plurality of beams associated with a transmitter network node beamforming codebook; and
        transmit a beam selection report that indicates at least one suggested transmission beam from the plurality of beams associated with the transmitter network node beamforming codebook, wherein the at least one suggested transmission beam from the plurality of beams associated with the transmitter network node beamforming codebook is based at least in part on a predictive operation that utilizes measurements of another plurality of beams received from the second network node.

2. The first network node of claim 1, wherein the one or more processors are further configured to obtain a channel estimate from the measurements, based at least in part on a sparse recovery operation.

3. The first network node of claim 2, wherein the sparse recovery operation is based at least in part on an orthogonal matching pursuit (OMP) procedure.

4. The first network node of claim 2, wherein the one or more processors are further configured to:
    receive, using at least one reception beam, a plurality of signals associated with a plurality of transmission beams; and
    obtain a plurality of beam measurements associated with the plurality of transmission beams based at least in part on the at least one reception beam.

5. The first network node of claim 4, wherein the one or more processors are further configured to:
    determine the channel estimate based at least in part on using the measurements as inputs to the sparse recovery operation; and
    determine the at least one reception beam based at least in part on the channel estimate.

6. The first network node of claim 5, wherein the measurements are associated with at least one beam pair, of a set of beam pairs, corresponding to a subset of reference signal received power (RSRP) measurements having largest RSRP values of a set of RSRP values associated with a plurality of beam pairs, wherein each beam pair of the plurality of beam pairs comprises a transmission beam of the plurality of transmission beams and a reception beam of the at least one reception beam.

7. The first network node of claim 1, further comprising a transceiver, wherein the one or more processors are further configured to communicate, by the transceiver, with the second network node using at least one reception beam, wherein the at least one reception beam comprises a reception beam associated with an oversampled receiver network node beamforming codebook.

8. The first network node of claim 1, wherein a channel estimate is obtained from the measurements, and wherein the at least one suggested transmission beam is based at least in part on the channel estimate.

9. The first network node of claim 8, wherein the at least one suggested transmission beam is based at least in part on a mapping between the channel estimate and the transmitter network node beamforming codebook, and wherein the mapping is based at least in part on a trained neural network.

10. The first network node of claim 1, wherein a channel estimate is obtained from the measurements, and wherein the at least one suggested transmission beam is based at least in part on performing a grid search operation associated with the transmitter network node beamforming codebook and based at least in part on the channel estimate.

11. The first network node of claim 1, wherein the one or more processors are further configured to receive a beam suggestion response indication that indicates whether the second network node will use the at least one suggested transmission beam.

12. The first network node of claim 11, wherein the one or more processors are further configured to determine to use at least one reception beam based at least in part on the beam suggestion response indication.

13. The first network node of claim 1, wherein the measurements are obtained using codebook beams that are associated with an algorithmic procedure.

14. The first network node of claim 1, wherein the one or more processors are further configured to:
perform a mapping, using a neural network, to one or more indices of one or more beams in the transmitter network node beamforming codebook.

15. The first network node of claim 1, wherein the at least one suggested transmission beam is based at least in part on a mapping between the measurements and the transmitter network node beamforming codebook.

16. A first network node for wireless communication, comprising: one or more memories; and one or more processors, coupled to the one or more memories, configured to:
transmit, to a second network node, information that indicates a plurality of beams associated with a transmitter network node beamforming codebook; and
receive a beam selection report that indicates at least one suggested transmission beam from the plurality of beams associated with the transmitter network node beamforming codebook, wherein the at least one suggested transmission beam from the plurality of beams associated with the transmitter network node beamforming codebook is based at least in part on a predictive operation that that utilizes measurements of another plurality of beams transmitted by the first network node.

17. The first network node of claim 16, wherein the at least one suggested transmission beam is based at least in part on a channel estimate, wherein the channel estimate is based at least in part on a sparse recovery operation.

18. The first network node of claim 17, wherein the sparse recovery operation is based at least in part on an orthogonal matching pursuit (OMP) procedure.

19. The first network node of claim 17, wherein the sparse recovery operation is not based on beam measurements associated with beams that are associated with the transmitter network node beamforming codebook.

20. The first network node of claim 17, wherein the at least one suggested transmission beam is based at least in part on a mapping between the channel estimate and the transmitter network node beamforming codebook, and wherein the mapping is based at least in part on a trained neural network.

21. The first network node of claim 17, wherein the at least one suggested transmission beam is based at least in part on a grid search operation associated with the transmitter network node beamforming codebook and based at least in part on the channel estimate.

22. The first network node of claim 16, further comprising a transceiver, wherein the one or more processors are further configured to transmit, by the transceiver, a beam suggestion response indication that indicates whether the first network node will use the at least one suggested transmission beam.

23. A method of wireless communication performed by a first network node, comprising:
receiving, from a second network node, information that indicates a plurality of beams associated with a transmitter network node beamforming codebook; and
transmitting a beam selection report that indicates at least one suggested transmission beam from the plurality of beams associated with the transmitter network node beamforming codebook, wherein the at least one suggested transmission beam from the plurality of beams associated with the transmitter network node beamforming codebook is based at least in part on a predictive operation that utilizes measurements of another plurality of beams received from the second network node.

24. The method of claim 23, further comprising obtaining a channel estimate from the measurements, based at least in part on a sparse recovery operation.

25. The method of claim 24, further comprising:
receiving, using at least one reception beam, a plurality of signals associated with a plurality of transmission beams; and
obtaining a plurality of beam measurements associated with the plurality of transmission beams based at least in part on the at least one reception beam.

26. The method of claim 25, further comprising:
determining the channel estimate based at least in part on using the measurements as inputs to the sparse recovery operation; and
determining the at least one reception beam based at least in part on the channel estimate.

27. The method of claim 25, further comprising:
communicating with the second network node using the at least one reception beam, wherein the at least one reception beam comprises a reception beam associated with an oversampled receiver network node beamforming codebook.

28. The method of claim 23, wherein a channel estimate is obtained from the measurements, and wherein the at least one suggested transmission beam is based at least in part on a mapping between the channel estimate and the transmitter network node beamforming codebook, and wherein the mapping is based at least in part on a trained neural network.

29. The method of claim 23, wherein a channel estimate is obtained from the measurements, and wherein the at least one suggested transmission beam is based at least in part on performing a grid search operation associated with the transmitter network node beamforming codebook and based at least in part on the channel estimate.

30. A method of wireless communication performed by a first network node, comprising:
transmitting, to a second network node, information that indicates a plurality of beams associated with a transmitter network node beamforming codebook; and
receiving a beam selection report that indicates at least one suggested transmission beam from the plurality of beams associated with the transmitter network node beamforming codebook, wherein the at least one suggested transmission beam from the plurality of beams associated with the transmitter network node beamforming codebook is based at least in part on a predictive operation that utilizes measurements of another plurality of beams transmitted by the first network node.

* * * * *